US010904374B2

(12) United States Patent
Spivack et al.

(10) Patent No.: US 10,904,374 B2
(45) Date of Patent: Jan. 26, 2021

(54) SYSTEMS, METHODS AND APPARATUSES TO FACILITATE GRADUAL OR INSTANTANEOUS ADJUSTMENT IN LEVELS OF PERCEPTIBILITY OF VIRTUAL OBJECTS OR REALITY OBJECT IN A DIGITAL SCENE

(71) Applicant: Magical Technologies, LLC, Redmond, WA (US)

(72) Inventors: Nova Spivack, Redmond, WA (US); Matthew Hoerl, Redmond, WA (US)

(73) Assignee: Magical Technologies, LLC, Wilmington, DE (US)

( * ) Notice: Subject to any disclaimer, the term of this patent is extended or adjusted under 35 U.S.C. 154(b) by 0 days.

(21) Appl. No.: 16/252,886

(22) Filed: Jan. 21, 2019

(65) Prior Publication Data
US 2019/0260870 A1    Aug. 22, 2019

Related U.S. Application Data

(60) Provisional application No. 62/621,470, filed on Jan. 24, 2018.

(51) Int. Cl.
*H04M 1/725* (2006.01)
*G06F 3/01* (2006.01)
*G06T 19/00* (2011.01)

(52) U.S. Cl.
CPC ......... *H04M 1/72544* (2013.01); *G06F 3/011* (2013.01); *G06T 19/003* (2013.01); *G06T 19/006* (2013.01)

(58) Field of Classification Search
CPC ..... G06T 19/006; G06T 11/60; G06T 19/003; G06F 3/011; G06F 3/0484; G06F 3/04847; H04M 1/72544
See application file for complete search history.

(56) References Cited

U.S. PATENT DOCUMENTS 8,231,465 B2    7/2012  Yee
8,878,846 B1   11/2014  Francis
(Continued)

FOREIGN PATENT DOCUMENTS

WO          2017093605          6/2017
WO    WO-2017093605 A1 *   6/2017   ......... G06F 3/04815
(Continued)

OTHER PUBLICATIONS

International Search Report & Written Opinion for Application No. PCT/US18/44214, Date of filing: Jul. 27, 2018, Applicant: Magical Technologies, LLC, dated Nov. 23, 2018, 20 pages.
(Continued)

*Primary Examiner* — Jeffery A Brier
(74) *Attorney, Agent, or Firm* — London Bridge Ventures

(57) ABSTRACT

Systems, methods and apparatuses to Facilitate Gradual or Instantaneous Adjustment in Levels of Perceptibility of Virtual Objects or Reality Object in a Digital Scene are disclosed. In one aspect, embodiments of the present disclosure include a method, which may be implemented on a system, to increase a first perceptibility level of a virtual object or decrease a second perceptibility level of a reality object to increase the virtualness level of the scene. The method can further include decreasing the first perceptibility level of a virtual object or increasing the second perceptibility level of a reality object to decease the virtualness level of the scene

32 Claims, 13 Drawing Sheets

MIXED REALITY (MR) -
AR / BR EMPHASIZED OVER VIRTUAL REALITY (VR)

(56) References Cited

U.S. PATENT DOCUMENTS

| | | | |
|---|---|---|---|
| 10,339,721 B1 | 7/2019 | Dascola | |
| 10,496,272 B1 | 12/2019 | Lonkar | |
| 2002/0099257 A1* | 7/2002 | Parker | G02B 27/0093 600/27 |
| 2002/0099679 A1 | 7/2002 | Usitalo | |
| 2005/0021472 A1 | 1/2005 | Gettman | |
| 2008/0140494 A1 | 6/2008 | Charuk | |
| 2008/0215415 A1 | 8/2008 | Willms | |
| 2009/0061901 A1 | 3/2009 | Arrasvuori | |
| 2009/0234948 A1 | 9/2009 | Garbow | |
| 2009/0259662 A1 | 10/2009 | Cragun | |
| 2010/0100487 A1 | 4/2010 | Lingafelt | |
| 2010/0114662 A1 | 5/2010 | Jung | |
| 2011/0251902 A1 | 10/2011 | Nagarajayya | |
| 2012/0116728 A1 | 5/2012 | Shear | |
| 2012/0154441 A1 | 6/2012 | Kim | |
| 2012/0218296 A1 | 8/2012 | Belimpasakis | |
| 2012/0229508 A1 | 9/2012 | Wigdor | |
| 2012/0239213 A1 | 9/2012 | Nagata et al. | |
| 2012/0256954 A1 | 10/2012 | Soon-Shiong | |
| 2013/0083173 A1 | 4/2013 | Geisner | |
| 2013/0141419 A1 | 6/2013 | Mount | |
| 2013/0211945 A1 | 8/2013 | Po-Ching | |
| 2013/0263016 A1 | 10/2013 | Lehtiniemi | |
| 2013/0286004 A1 | 10/2013 | McCullouch | |
| 2013/0293468 A1 | 11/2013 | Perez | |
| 2013/0293584 A1 | 11/2013 | Anderson | |
| 2013/0336093 A1 | 12/2013 | Suvanto | |
| 2014/0063197 A1 | 3/2014 | Yamamoto et al. | |
| 2014/0071164 A1 | 3/2014 | Saklatvala | |
| 2014/0100955 A1 | 4/2014 | Osotio | |
| 2014/0100994 A1 | 4/2014 | Tatzel | |
| 2014/0114845 A1 | 4/2014 | Rogers | |
| 2014/0208272 A1 | 7/2014 | Vats | |
| 2014/0361971 A1* | 12/2014 | Sala | G06F 3/041 345/156 |
| 2014/0369558 A1 | 12/2014 | Holz | |
| 2014/0372540 A1 | 12/2014 | Libin | |
| 2015/0055821 A1* | 2/2015 | Fotland | G06K 9/3241 382/103 |
| 2015/0058102 A1 | 2/2015 | Christensen | |
| 2015/0123966 A1 | 5/2015 | Newman | |
| 2015/0187137 A1 | 7/2015 | Mullins | |
| 2015/0213355 A1 | 7/2015 | Sharma | |
| 2015/0302517 A1 | 10/2015 | Spivack | |
| 2015/0302652 A1 | 10/2015 | Miller et al. | |
| 2015/0371447 A1 | 12/2015 | Yasutake | |
| 2015/0378440 A1 | 12/2015 | Umlauf | |
| 2016/0026253 A1 | 1/2016 | Bradski | |
| 2016/0100034 A1 | 4/2016 | Miller | |
| 2016/0175715 A1 | 6/2016 | Ye | |
| 2016/0203645 A1 | 7/2016 | Knepp | |
| 2016/0234643 A1 | 8/2016 | Crutchfield | |
| 2016/0323332 A1 | 11/2016 | Welinder | |
| 2016/0330522 A1* | 11/2016 | Newell | G06F 21/604 |
| 2016/0335289 A1 | 11/2016 | Andrews | |
| 2017/0052507 A1 | 2/2017 | Poulos | |
| 2017/0093780 A1 | 3/2017 | Lieb | |
| 2017/0103584 A1 | 4/2017 | Vats | |
| 2017/0123750 A1 | 5/2017 | Todasco | |
| 2017/0154242 A1 | 6/2017 | Blanchflower | |
| 2017/0178373 A1* | 6/2017 | Sarafa | G06T 11/60 |
| 2017/0186232 A1 | 6/2017 | Dange | |
| 2017/0243403 A1 | 8/2017 | Daniels | |
| 2018/0053267 A1 | 2/2018 | Penner | |
| 2018/0089869 A1 | 3/2018 | Bostick | |
| 2018/0096362 A1 | 4/2018 | Kwan | |
| 2018/0113594 A1 | 4/2018 | Alnatsheh | |
| 2018/0145937 A1 | 5/2018 | Choi | |
| 2018/0190003 A1 | 7/2018 | Upadhyay | |
| 2018/0190166 A1* | 7/2018 | Salmimaa | G02B 27/017 |
| 2018/0268589 A1 | 9/2018 | Grant | |
| 2018/0349088 A1* | 12/2018 | Leppanen | G06F 3/011 |
| 2018/0350146 A1 | 12/2018 | Gervasio | |
| 2018/0365883 A1 | 12/2018 | Fillhardt et al. | |
| 2018/0365897 A1 | 12/2018 | Pahud | |
| 2018/0365898 A1* | 12/2018 | Costa | G06F 3/0304 |
| 2019/0005724 A1 | 1/2019 | Pahud | |
| 2019/0080172 A1 | 3/2019 | Zheng et al. | |
| 2019/0102946 A1 | 4/2019 | Spivack | |
| 2019/0107935 A1 | 4/2019 | Spivack | |
| 2019/0107990 A1 | 4/2019 | Spivack | |
| 2019/0107991 A1 | 4/2019 | Spivack | |
| 2019/0108558 A1 | 4/2019 | Spivack | |
| 2019/0108578 A1 | 4/2019 | Spivack | |
| 2019/0108580 A1 | 4/2019 | Spivack | |
| 2019/0108682 A1 | 4/2019 | Spivack | |
| 2019/0108686 A1 | 4/2019 | Spivack | |
| 2019/0132700 A1 | 5/2019 | Yokoyama | |
| 2019/0188450 A1 | 6/2019 | Spivack | |
| 2019/0253542 A1 | 8/2019 | Fan et al. | |
| 2019/0260870 A1 | 8/2019 | Spivack | |
| 2019/0266404 A1 | 8/2019 | Spivack | |
| 2019/0318076 A1 | 10/2019 | Chun | |
| 2019/0391637 A1 | 12/2019 | Taylor | |
| 2019/0392085 A1 | 12/2019 | Ragan | |
| 2020/0019295 A1 | 1/2020 | Spivack | |
| 2020/0019296 A1 | 1/2020 | Spivack | |
| 2020/0021784 A1 | 1/2020 | Grusche | |
| 2020/0068133 A1 | 2/2020 | Spivack | |

FOREIGN PATENT DOCUMENTS

| | | |
|---|---|---|
| WO | 2019023659 | 1/2019 |
| WO | 2019028159 | 2/2019 |
| WO | 2019028479 | 2/2019 |
| WO | 2019055703 | 3/2019 |
| WO | 2019079826 | 4/2019 |
| WO | 2020018431 | 1/2020 |

OTHER PUBLICATIONS

International Search Report & Written Opinion for Application No. PCT/US18/44844, Date of filing: Aug. 1, 2018, Applicant: Magical Technologies, LLC, dated Nov. 16, 2018, 13 pages.

International Search Report & Written Opinion for Application No. PCT/US18/45450, Date of filing: Aug. 6, 2018, Applicant: Magical Technologies, LLC, dated Jan. 2, 2019, 20 pages.

International Search Report & Written Opinion for Application No. PCT/US18/50952, Date of filing: Sep. 13, 2018, Applicant: Magical Technologies, LLC, dated Mar. 15, 2019, 22 pages.

International Search Report & Written Opinion for Application No. PCT/US18/56951, Date of filing: Oct. 22, 2018, Applicant: Magical Technologies, LLC, dated Feb. 22, 2019, 17 pages.

International Search Report & Written Opinion for Application No. PCT/US19/41821, Date of filing: Jul. 15, 2019, Applicant: Magical Technologies, LLC, dated Nov. 21, 2019, 9 pages.

"Fujifilm balloon" (downloaded @https://web.archive.org/web/20150514181842/http://www.imageafter.com/image.php?image=b2ain/ehicle3002.jpg, (Year: 2015).

"Print Ad Rates", downloaded @ https://web.archive.org/web/20160319050126/https://diverseeducation.com/media-kit/print-ad-rates/,available online since Mar. 14, 2016 (Year: 2016).

Mehdi Mekni et al., 'Augmented Reality Applications, Challenges and Future Trends', Applied computer and applied computational science, Apr. 25, 2014, pp. 205-214.

English translation of KR 2014-0088578, 2019, 18 pages.
English translation of KR 101693631 BI, 2019, 13 pages.
English translation of KR 20120007215 A, 2019. 9 pages.
English translation of KR 20140043522 A, 2019, 25 pages.
Previtali et al. ("A Flexible Methodology for Outdoor/Indoor Building Reconstruction From Occluded Point Clouds", ISRS Annals of the Photogrammetry, Remote Sensing and Spatial Information Sciences, vol. II-3, 2014 ISPRS Technical Commission III Symposium, Sep. 5-7, 2014, Zurich, Switzerland) (Year: 2014).

* cited by examiner

BASIC REALITY (BR)

AUGMENTED REALITY (BR)

MIXED REALITY (MR) -
AR / BR EMPHASIZED OVER VIRTUAL REALITY (VR)

MIXED REALITY (MR) -
SIMILAR EMPHASIS OF VR, BR AND AR

MIXED REALITY (MR) -
VIRTUAL REALITY (VR) EMPHASIZED

VIRTUAL REALITY (VR)

US 10,904,374 B2

SYSTEMS, METHODS AND APPARATUSES TO FACILITATE GRADUAL OR INSTANTANEOUS ADJUSTMENT IN LEVELS OF PERCEPTIBILITY OF VIRTUAL OBJECTS OR REALITY OBJECT IN A DIGITAL SCENE

CLAIM OF PRIORITY

This application claims the benefit of:

U.S. Provisional Application No. 62/621,470, filed Jan. 24, 2018 and entitled "Systems, Methods and Apparatuses to Facilitate Gradual or Instantaneous Change or Adjustment in Levels of Perceptibility of Virtual Objects and Reality Object in a Digital Environment," (8009.US00), the contents of which are incorporated by reference in their entirety.

RELATED APPLICATIONS

This application is related to PCT Application no. PCT/US2018/44844, filed Aug. 1, 2018 and entitled "Systems, Methods and Apparatuses to Facilitate Trade or Exchange of Virtual Real-Estate Associated with a Physical Space", the contents of which are incorporated by reference in their entirety.

This application is related to PCT Application no. PCT/US2018/45450, filed Aug. 6, 2018 and entitled "Systems, Methods and Apparatuses for Deployment and Targeting of Context-Aware Virtual Objects and/or Objects and/or Behavior Modeling of Virtual Objects Based on Physical Principles", the contents of which are incorporated by reference in their entirety.

This application is related to PCT Application no. PCT/US2018/50952, filed on Sep. 13, 2018 and entitled "Systems And Methods Of Shareable Virtual Objects and Virtual Objects As Message Objects To Facilitate Communications Sessions In An Augmented Reality Environment", the contents of which are incorporated by reference in their entirety.

This application is related to PCT Application No. Pct/US2018/56951, filed Oct. 22, 2018 and entitled "Systems, methods and apparatuses of digital assistants in an augmented reality environment and local determination of virtual object placement and apparatuses of single or multi-directional lens as portals between a physical world and a digital world component of the augmented reality environment" (8005.WO01), the contents of which are incorporated by reference in their entirety.

TECHNICAL FIELD

The disclosed technology relates generally to techniques to control or adjust various mixtures of perceptibility, in a digital environment, between the real world objects/content/environment and virtual objects/content/environment.

BACKGROUND

The advent of the World Wide Web and its proliferation in the 90's transformed the way humans conduct business, personal lives, consume/communicate information and interact with or relate to others. A new wave of technology is on the cusp of the horizon to revolutionize our already digitally immersed lives.

DETAILED DESCRIPTION

Figure 1:
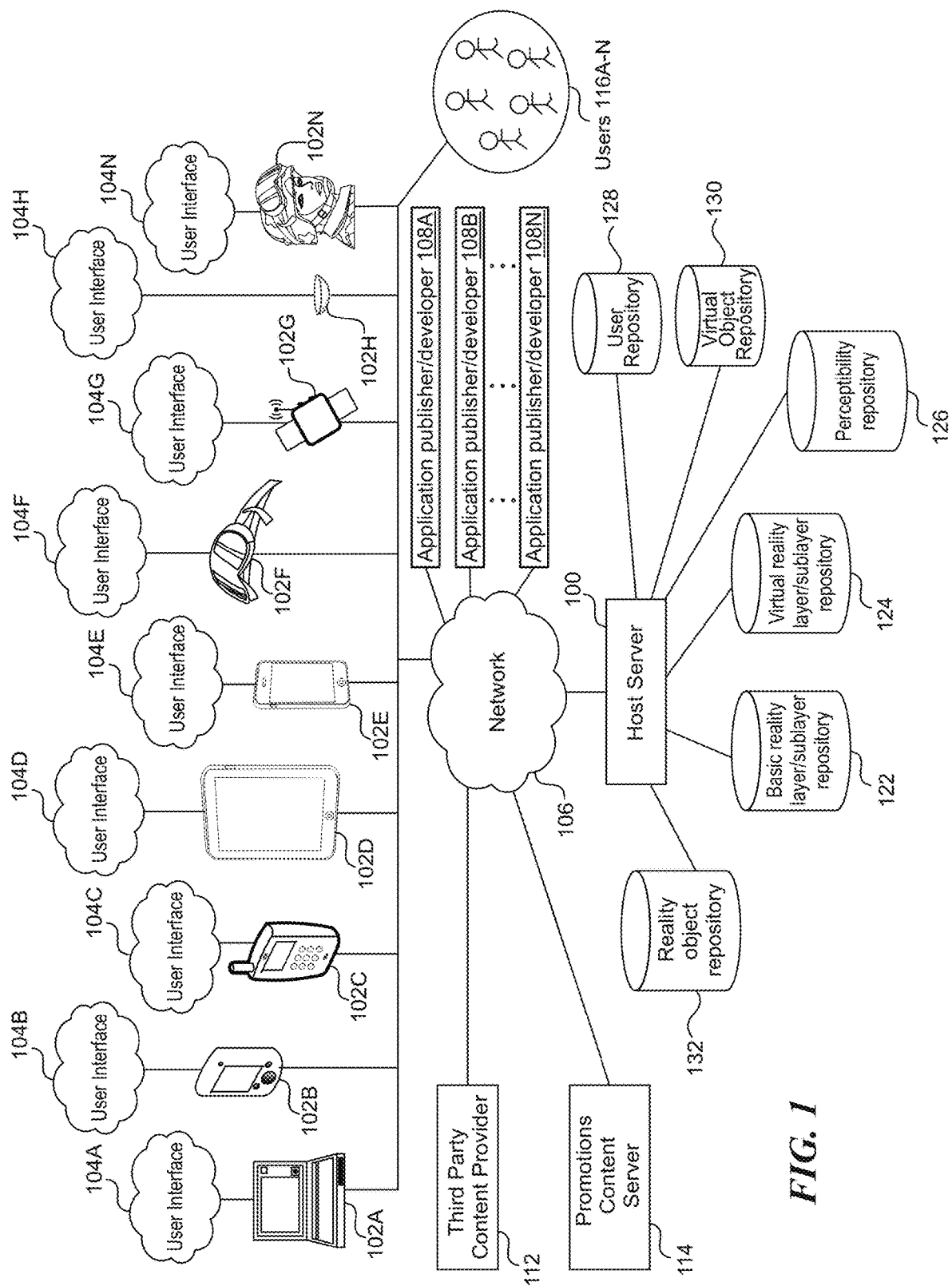
FIG. 1 illustrates an example block diagram of a host server able to facilitate gradual or instantaneous adjustment in levels of perceptibility of virtual objects or reality objects in a digital scene, in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for adjusting levels of perceptibility of user-perceivable content/information via a platform which facilitates user interaction with objects in a digital environment. Aspects of the present disclosure include techniques to control or adjust various mixtures of perceptibility, in a digital environment, between the real world objects/content/environment and virtual objects/content/environment. Embodiments of the present disclosure further include control or adjustment of relative perceptibility between real things (e.g., real world objects/content/environment) and virtual things (e.g., virtual objects/content/environment).

The innovation includes for example, techniques to control or adjust various mixtures of perceptibility, in a digital environment, between the real world objects/content/environment and virtual objects/content/environment.

Digital Objects

The digital objects presented by the disclosed system in a digital environment, can, for instance, include:

a) 'virtual objects' which can include any computer generated, computer animated, digitally rendered/reproduced, artificial objects/environment and/or synthetic objects/environment. Virtual objects need not have any relation or context to the real world or its phenomena or its object places or things. Virtual objects generally also include the relative virtual objects or 'simulated objects' as described below in b).

b) 'Relative virtual objects' or also referred to as 'simulated objects' can generally include virtual objects/environments that augment or represent real objects/environments of the real world. Relative virtual objects (e.g., simulated objects) generally further include virtual objects that are temporally or spatially relevant and/or has any relation, relevance, ties, correlation, anti-correlation, context to real world phenomenon, concepts or its objects, places, persons or things; 'relative virtual objects' or 'simulated objects' can also include or have relationships to, events, circumstances, causes, conditions, context, user behavior or profile or intent, nearby things, other virtual objects, program state, interactions with people or virtual things or physical things or real or virtual environments, real or virtual physical laws, game mechanics, rules. In general 'relative virtual objects' can include any digital object that appears, disappears, or is generated, modified or edited based on any of the above factors.

c) 'Reality objects' or 'basic reality objects' which can perceptibly (e.g., visually or audibly) correspond to renderings or exact/substantially exact reproductions of reality itself. Reality includes tangibles or intangible in the real world. Such renderings or reproductions can include by way of example, an image, a (screenshot) shot, photo, video, live stream of a physical scene and/or its visible component or recordings or (live) stream of an audible component, e.g., sound of an airplane, traffic noise, Niagara falls, birds chirping.

The disclosed system (e.g. host server 100 of FIG. 1 and/or host server 300 of FIG. 3A-3B) can depict/present/augment, via a user device any combination/mixture of: virtual objects (including 'relative virtual objects') and reality objects (or, also referred to as 'basic reality objects'). Any mixture of such objects can be depicted in a digital environment (e.g., via visible area or user-perceptible area on a display or device, or a projection in the air/space).

Embodiments of the present disclosure further enable and facilitate adjustment and selection of the level/degree of perceptibility amongst the objects of varying levels of 'virtualness.' by a user, by a system, a platform or by any given application/software component in a given system.

Specifically, innovative aspects of the present disclosure include facilitating selection or adjustment of perceptibility (human perceptibility) amongst the virtual objects, reality objects, and/or relative virtual objects (e.g., simulated objects) in a digital environment (e.g., for any given scene or view). This adjustment and selection mechanism(e.g., via the user controls shown in the examples of FIG. 6A-6B) affects the virtualness of any given digital environment, with increased perceptibility of virtual objects generally corresponding to a higher virtualness level, with decreased perceptibility of virtual objects corresponding to a lower virtualness level. Similarly, decreased perceptibility of reality objects corresponds to increased virtualness and increased perceptibility of reality objects corresponds generally to decreased virtualness.

In one example embodiment of the present disclosure, opacity is used to adjust various components or objects in a digital environment can be thought of or implemented as a new dimension in a platform or user interface like window size and window location.

Embodiments of the present disclosure include systems, methods and apparatuses of platforms (e.g., as hosted by the host server 100 as depicted in the example of FIG. 1) for deployment and targeting of context-aware virtual objects and/or behavior modeling of virtual objects based on physical laws or principle. Further embodiments relate to how interactive virtual objects that correspond to content or physical objects in the physical world are detected and/or generated, and how users can then interact with those virtual objects, and/or the behavioral characteristics of the virtual objects, and how they can be modeled. Embodiments of the present disclosure further include processes that augmented reality data (such as a label or name or other data) with media content, media content segments (digital, analog, or physical) or physical objects. Yet further embodiments of the present disclosure include a platform (e.g., as hosted by the host server 100 as depicted in the example of FIG. 1) to provide an augmented reality (AR) workspace in a physical space, where a virtual object can be rendered as a user interface element of the AR workspace.

Embodiments of the present disclosure further include systems, methods and apparatuses of platforms (e.g., as hosted by the host server 100 as depicted in the example of FIG. 1) for managing and facilitating transactions or other activities associated with virtual real-estate (e.g., or digital real-estate). In general, the virtual or digital real-estate is associated with physical locations in the real world. The platform facilitates monetization and trading of a portion or portions of virtual spaces or virtual layers (e.g., virtual real-estate) of an augmented reality (AR) environment (e.g., alternate reality environment, mixed reality (MR) environment) or virtual reality VR environment.

In an augmented reality environment (AR environment), scenes or images of the physical world is depicted with a virtual world that appears to a human user, as being superimposed or overlaid of the physical world. Augmented reality enabled technology and devices can therefore facilitate and enable various types of activities with respect to and within virtual locations in the virtual world. Due to the inter connectivity and relationships between the physical world and the virtual world in the augmented reality environment, activities in the virtual world can drive traffic to the corresponding locations in the physical world. Similarly, content or virtual objects (VOBs) associated with busier physical locations or placed at certain locations (e.g., eye level versus other levels) will likely have a larger potential audience.

By virtue of the inter-relationship and connections between virtual spaces and real world locations enabled by or driven by AR, just as there is a value to real-estate in the real world locations, there can be inherent value or values for the corresponding virtual real-estate in the virtual spaces. For example, an entity who is a right holder (e.g., owner, renter, sub-lettor, licensor) or is otherwise associated a region of virtual real-estate can control what virtual objects can be placed into that virtual real-estate.

The entity that is the rightholder of the virtual real-state can control the content or objects (e.g.,., virtual objects) that can be placed in it, by whom, for how long, etc. As such, the disclosed technology includes a marketplace (e.g., as run by server 100 of FIG. 1) to facilitate exchange of virtual real-estate (VRE) such that entities can control object or content placement to a virtual space that is associated with a physical space.

Embodiments of the present disclosure further include systems, methods and apparatuses of seamless integration of augmented, alternate, virtual, and/or mixed realities with physical realities for enhancement of web, mobile and/or other digital experiences. Embodiments of the present disclosure further include systems, methods and apparatuses to facilitate physical and non-physical interaction/action/reactions between alternate realities. Embodiments of the present disclosure also systems, methods and apparatuses of multidimensional mapping of universal locations or location ranges for alternate or augmented digital experiences. Yet further embodiments of the present disclosure include systems, methods and apparatuses to create real world value and demand for virtual spaces via an alternate reality environment.

The disclosed platform enables and facilitates authoring, discovering, and/or interacting with virtual objects (VOBs). One example embodiment includes a system and a platform that can facilitate human interaction or engagement with virtual objects (hereinafter, 'VOB,' or 'VOBs') in a digital realm (e.g., an augmented reality environment (AR), an alternate reality environment (AR), a mixed reality environment (MR) or a virtual reality environment (VR)). The human interactions or engagements with VOBs in or via the disclosed environment can be integrated with and bring utility to everyday lives through integration, enhancement or optimization of our digital activities such as web browsing, digital (online, or mobile shopping) shopping, socializing (e.g., social networking, sharing of digital content, maintaining photos, videos, other multimedia content), digital communications (e.g., messaging, emails, SMS, mobile communication channels, etc.), business activities (e.g., document management, document procession), business processes (e.g., IT, HR, security, etc.), transportation, travel, etc.

The disclosed innovation provides another dimension to digital activities through integration with the real world environment and real world contexts to enhance utility, usability, relevancy, and/or entertainment or vanity value through optimized contextual, social, spatial, temporal awareness and relevancy. In general, the virtual objects depicted via the disclosed system and platform. can be contextually (e.g., temporally, spatially, socially, user-specific, etc.) relevant and/or contextually aware. Specifically, the virtual objects can have attributes that are associated with or relevant real world places, real world events, humans, real world entities, real world things, real world objects, real world concepts and/or times of the physical world, and thus its deployment as an augmentation of a digital experience provides additional real life utility.

Note that in some instances, VOBs can be geographically, spatially and/or socially relevant and/or further possess real life utility. In accordance with embodiments of the present disclosure, VOBs can be or appear to be random in appearance or representation with little to no real world relation and have little to marginal utility in the real world. It is possible that the same VOB can appear random or of little use to one human user while being relevant in one or more ways to another user in the AR environment or platform.

The disclosed platform enables users to interact with VOBs and deployed environments using any device (e.g., devices 102A-N in the example of FIG. 1), including by way of example, computers, PDAs, phones, mobile phones, tablets, head mounted devices, goggles, smart watches, monocles, smart lens, smart watches and other smart apparel (e.g., smart shoes, smart clothing), and any other smart devices.

In one embodiment, the disclosed platform includes an information and content in a space similar to the World Wide Web for the physical world. The information and content can be represented in 3D and or have 360 or near 360 degree views. The information and content can be linked to one another by way of resource identifiers or locators. The host server (e.g., host server 100 as depicted in the example of FIG. 1) can provide a browser, a hosted server, and a search engine, for this new Web.

Embodiments of the disclosed platform enables content (e.g., VOBs, third party applications, AR-enabled applications, or other objects) to be created and placed into layers (e.g., components of the virtual world, namespaces, virtual world components, digital namespaces, etc.) that overlay geographic locations by anyone, and focused around a layer that has the highest number of audience (e.g., a public layer). The public layer can in some instances, be the main discovery mechanism and source for advertising venue for monetizing the disclosed platform.

In one embodiment, the disclosed platform includes a virtual world that exists in another dimension superimposed on the physical world. Users can perceive, observe, access, engage with or otherwise interact with this virtual world via a user interface (e.g., user interface 104A-N as depicted in the example of FIG. 1) of client application (e.g., accessed via using a user device, such as devices 102A-N as illustrated in the example of FIG. 1).

One embodiment of the present disclosure includes a consumer or client application component (e.g., as deployed on user devices, such as user devices 102A-N as depicted in the example of FIG. 1) which is able to provide geo-contextual awareness to human users of the AR environment and platform. The client application can sense, detect or recognize virtual objects and/or other human users, actors, non-player characters or any other human or computer participants that are within range of their physical location, and can enable the users to observe, view, act, interact, react with respect to the VOBs.

Furthermore, embodiments of the present disclosure further include an enterprise application (which can be desktop, mobile or browser based application). In this case, retailers, advertisers, merchants or third party e-commerce platforms/sites/providers can access the disclosed platform through the enterprise application which enables management of paid advertising campaigns deployed via the platform.

Users (e.g., users 116A-N of FIG. 1) can access the client application which connects to the host platform (e.g., as hosted by the host server 100 as depicted in the example of FIG. 1). The client application enables users (e.g., users 116A-N of FIG. 1) to sense and interact with virtual objects ("VOBs") and other users ("Users"), actors, non-player characters, players, or other participants of the platform. The VOBs can be marked or tagged (by QR code, other bar codes, or image markers) for detection by the client application.

One example of an AR environment deployed by the host (e.g., the host server 100 as depicted in the example of FIG. 1) enables users to interact with virtual objects (VOBs) or applications related to shopping and retail in the physical world or online/e-commerce or mobile commerce. Retailers, merchants, commerce/e-commerce platforms, classified ad systems, and other advertisers will be able to pay to promote virtual objects representing coupons and gift cards in physical locations near or within their stores. Retailers can benefit because the disclosed platform provides a new way to get people into physical stores. For example, this can be a way to offer VOBs can are or function as coupons and gift cards that are available or valid at certain locations and times.

Additional environments that the platform can deploy, facilitate, or augment can include for example AR-enabled games, collaboration, public information, education, tourism, travel, dining, entertainment etc.

The seamless integration of real, augmented and virtual for physical places/locations in the universe is a differentiator. In addition to augmenting the world, the disclosed system also enables an open number of additional dimensions to be layered over it and, some of them exist in different spectra or astral planes. The digital dimensions can include virtual worlds that can appear different from the physical world. Note that any point in the physical world can index to layers of virtual worlds or virtual world components at that point. The platform can enable layers that allow non-physical interactions.

FIG. 1 illustrates an example block diagram of a host server 100 able to facilitate gradual or instantaneous adjustment in levels of perceptibility of virtual objects or reality objects in a digital scene, in accordance with embodiments of the present disclosure.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102A-N can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, a wearable device, a head mounted device, a smart watch, a goggle, a smart glasses, a smart contact lens, and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, or a combination of the above.

The client devices 102A-N, application publisher/developer 108A-N, its respective networks of users, a third party content provider 112, and/or promotional content server 114, can be coupled to the network 106 and/or multiple networks. In some embodiments, the devices 102A-N and host server 100 may be directly connected to one another. The alternate, augmented provided or developed by the application publisher/developer 108A-N can include any digital, online, web-based and/or mobile based environments including enterprise applications, entertainment, games, social networking, e-commerce, search, browsing, discovery, messaging, chatting, and/or any other types of activities (e.g., network-enabled activities).

In one embodiment, the host server 100 is operable to facilitate gradual or instantaneous adjustment in levels of perceptibility of virtual objects or reality objects in a digital scene (e.g., as depicted or deployed via user devices 102A-N). The host server 100 can facilitate or depict transitioning in virtualness level for a scene for presentation to a user 116A-N via a user device 102A-N.

In one embodiment, the disclosed framework includes systems and processes for enhancing the web and its features with augmented reality. Example components of the framework can include:

Browser (mobile browser, mobile app, web browser, etc.)

Servers and namespaces the host (e.g., host server 100 can host the servers and namespaces. The content (e.g., VOBs, any other digital object), applications running on, with, or integrated with the disclosed platform can be created by others (e.g., third party content provider 112, promotions content server 114 and/or application publisher/developers 108A-N, etc.).

Advertising system (e.g., the host server 100 can run an advertisement/promotions engine through the platform and any or all deployed augmented reality, alternate reality, mixed reality or virtual reality environments)

Commerce (e.g., the host server 100 can facilitate transactions in the network deployed via any or all deployed augmented reality, alternate reality, mixed reality or virtual reality environments and receive a cut. A digital token or digital currency (e.g., crypto currency) specific to the platform hosted by the host server 100 can also be provided or made available to users.)

Search and discovery (e.g., the host server 100 can facilitate search, discovery or search in the network deployed via any or all deployed augmented reality, alternate reality, mixed reality or virtual reality environments)

Identities and relationships (e.g., the host server 100 can facilitate social activities, track identifies, manage, monitor, track and record activities and relationships between users 116A).

Figure 3A:
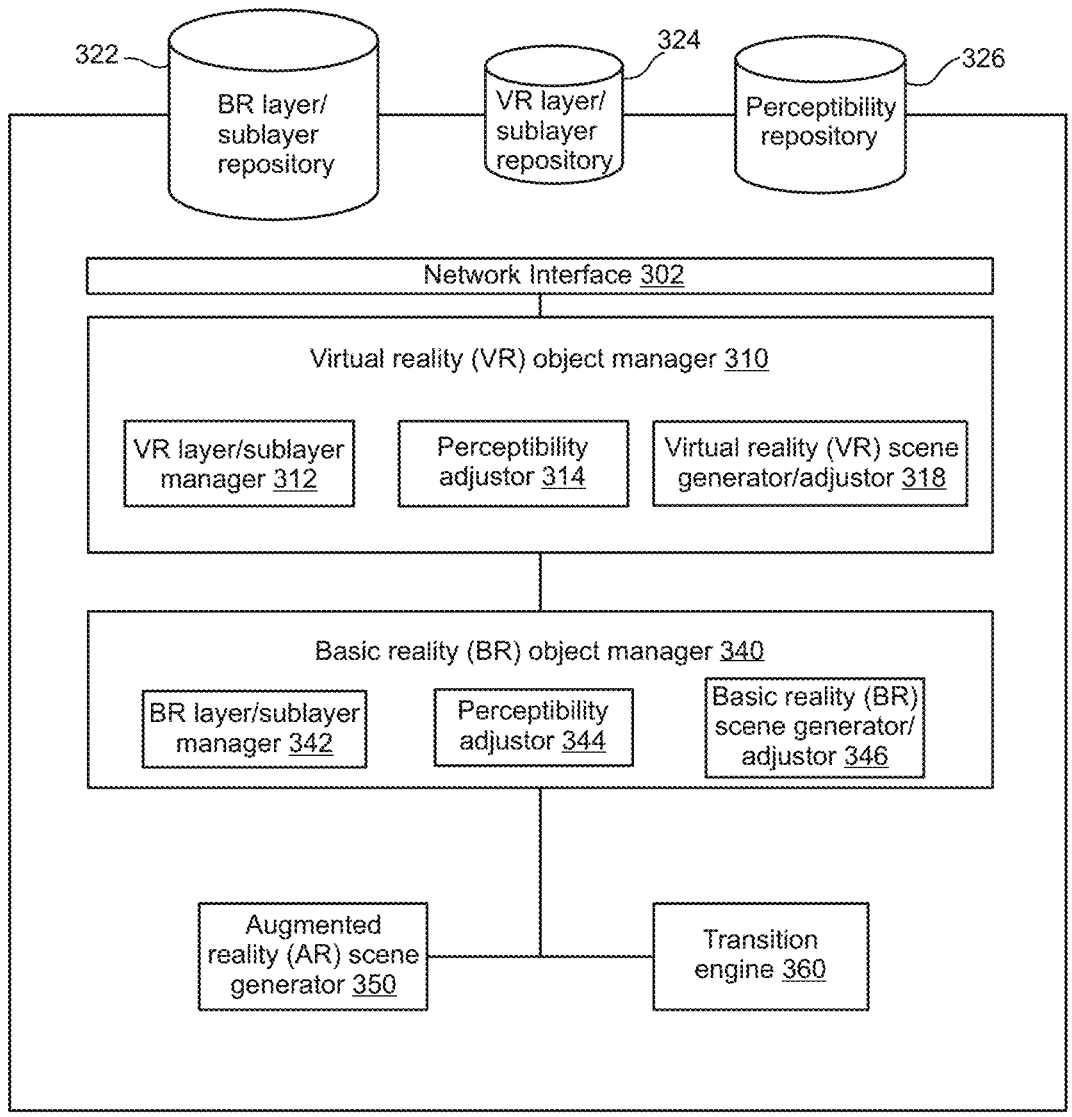
FIG. 3A depicts an example functional block diagram of a host server that facilitates gradual or instantaneous adjustment in levels of perceptibility of virtual objects or reality objects in a digital scene, in accordance with embodiments of the present disclosure.
Figure 3B:
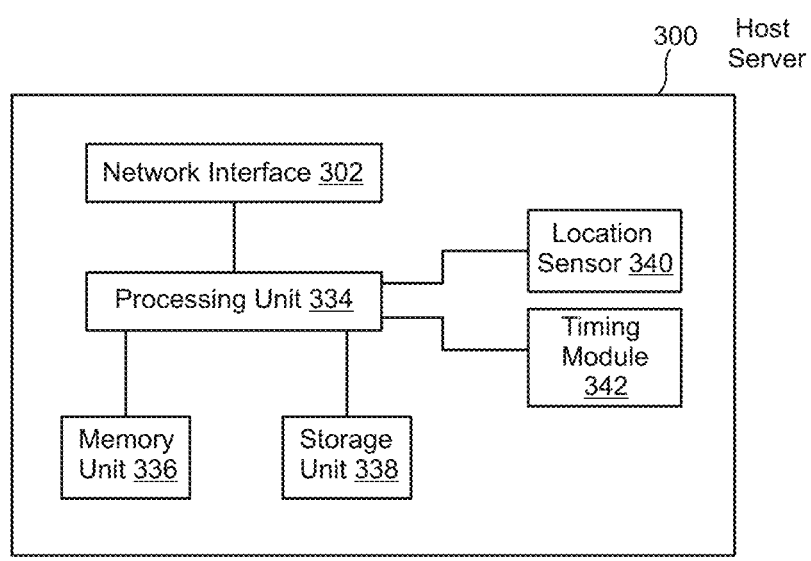
FIG. 3B depicts an example block diagram illustrating the components of the host server that facilitates gradual or instantaneous adjustment in levels of perceptibility of virtual objects or reality objects in a digital scene, in accordance with embodiments of the present disclosure

Functions and techniques performed by the host server 100 and the components therein are described in detail with further references to the examples of FIG. 3A-3B.

In general, network 106, over which the client devices 102A-N, the host server 100, and/or various application publisher/provider 108A-N, content server/provider 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 5G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a virtual object repository 130, a perceptibility repository 126, a virtual reality layer/sublayer repository 124, a basic reality layer/sublayer repository 122 and/or a reality object repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to generate, create and/or provide data to be stored in the user repository 128, the virtual object (VOB) repository 130, the perceptibility repository 126, the virtual reality layer/sublayer repository 124, the basic reality layer/sublayer repository 122 and/or a reality object repository 132. The user repository 128 a can store user information, user profile information, demographics information, analytics, statistics regarding human users, user interaction, brands advertisers, virtual object (or 'VOBs'), access of VOBs, usage statistics of VOBs, ROI of VOBs, etc.

The virtual object repository 130 can store virtual objects and any or all copies of virtual objects. The VOB repository 130 can store virtual content or VOBs that can be retrieved for consumption in a target environment, where the virtual content or VOBs are contextually relevant. The VOB repository 130 can also include data which can be used to generate (e.g., generated in part or in whole by the host server 100 and/or locally at a client device 102A-N) contextually-relevant or aware virtual content or VOB(s).

The reality object repository 132 can store reality objects and any or all copies of reality objects. The reality object repository 132 can store content or reality objects (e.g., basic reality objects) that can be retrieved for depiction in a BR scene or digital scene. The reality object repository 132 can also include data which can be used to generate (e.g., generated in part or in whole by the host server 100 and/or locally at a client device 102A-N) or reproduce photorealistic reality objects (e.g., basic reality (BR) objects).

The basic reality (BR) layer/sublayer repository 122 can store identifications of the number of layers or sublayers, identifiers for the BR layers or sublayers and/or rendering metadata of each given BR layer and/or sublayer for the host server 100 or client device 102A-N to render, create or generate or present the BR layer/sublayers.

The virtual reality (VR) layer/sublayer repository 124 can store identifications of the number of layers or sublayers, identifiers for the layers or sublayers and/or rendering metadata of each given VR layer and/or sublayer for the host server 100 or client device 102A-N to render, create or generate or present the VR layer/sublayers.

The perceptibility repository 126 can store perceptibility levels, adjustors, system settings, platform settings, operating system settings, application preferences, user preferences and/or user settings for BR objects, BR layers/sublayers, VR objects, VR layers/sublayers.

Figure 2A:
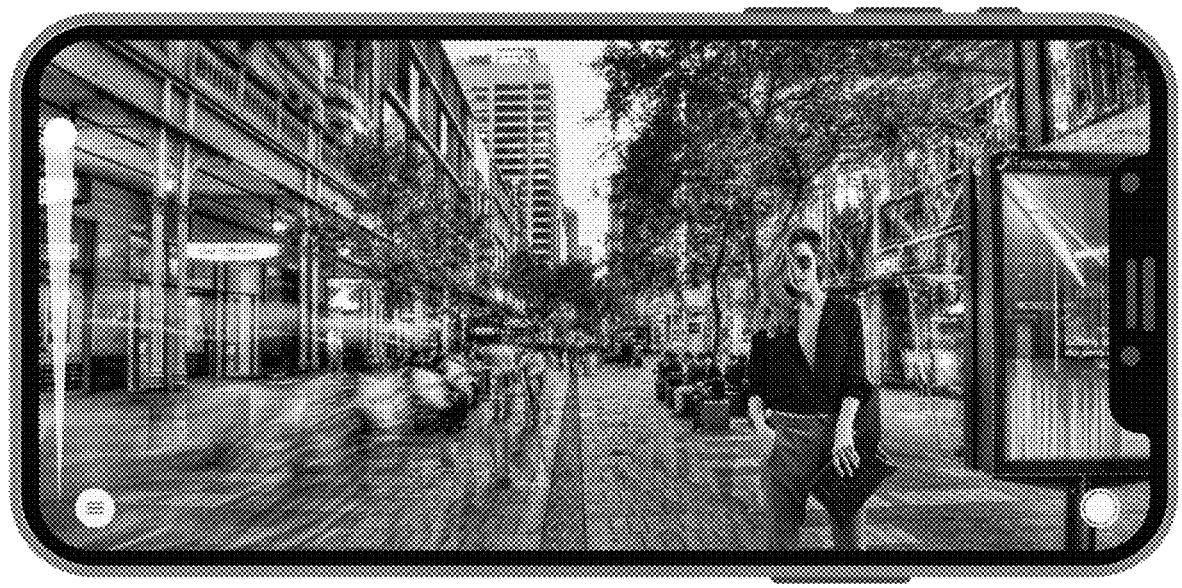
FIG. 2A depicts an example of a user interface of a digital scene showing a basic reality (BR) environment, in accordance with embodiments of the present disclosure.

FIG. 2A depicts an example of a user interface of a digital scene showing a basic reality (BR) environment in accordance with embodiments of the present disclosure.

Figure 2B:
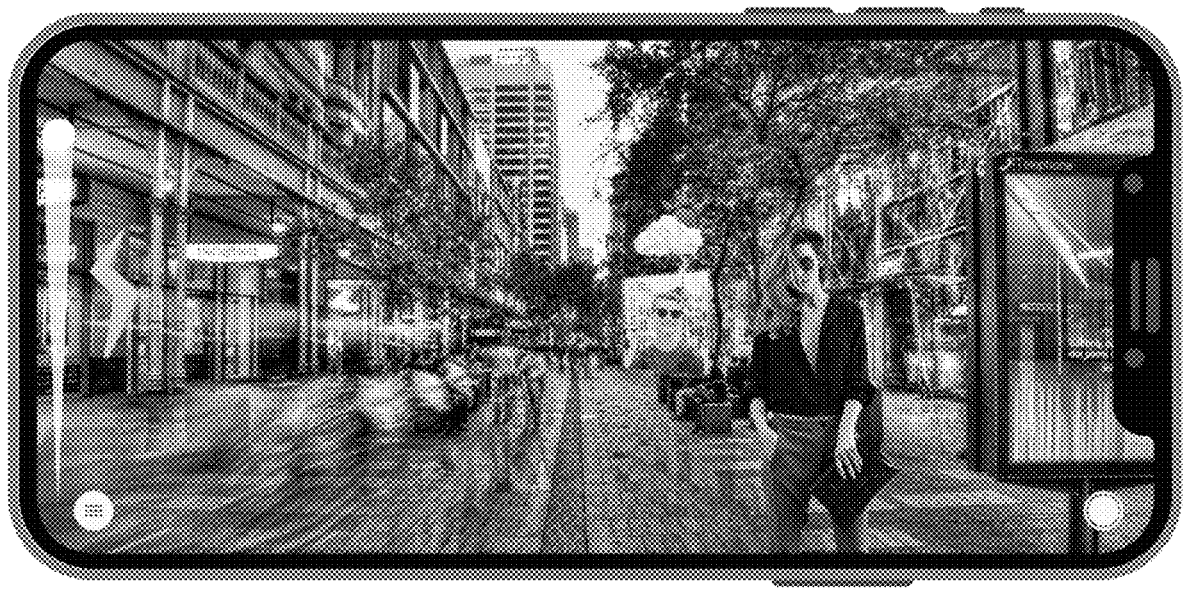
FIG. 2B depicts an example of a user interface of a digital scene showing an augmented reality (AR) environment, in accordance with embodiments of the present disclosure.

FIG. 2B depicts an example of a user interface of a digital scene showing an augmented reality (AR) environment, in accordance with embodiments of the present disclosure.

Figure 2C:
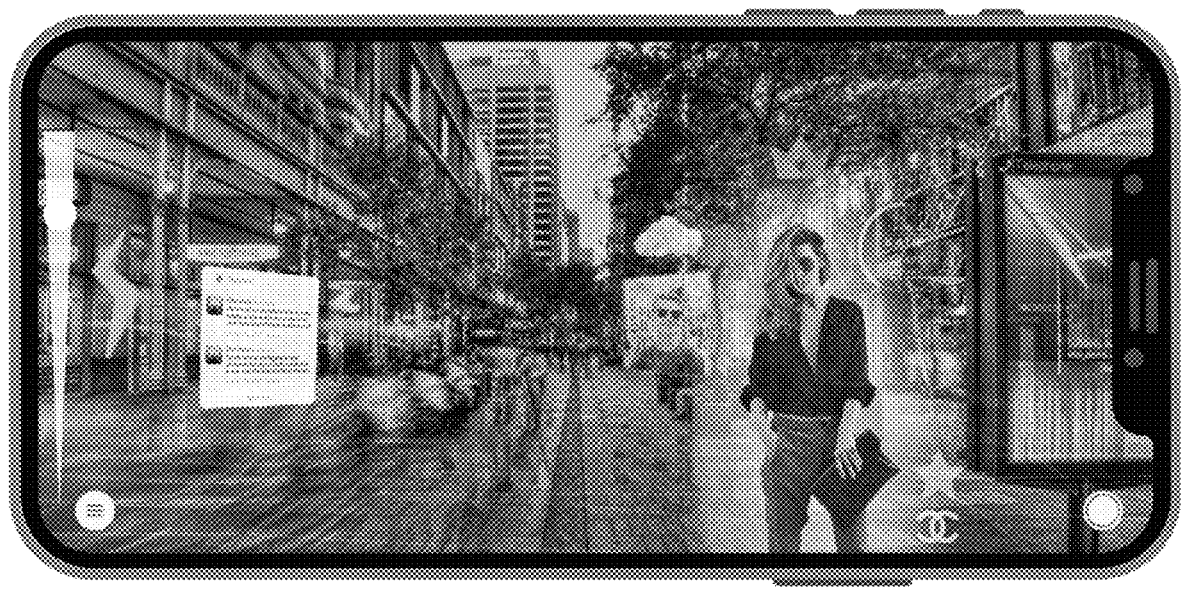
FIG. 2C depicts an example of a user interface of a digital scene showing a mixed reality (MR) environment, in accordance with embodiments of the present disclosure.

FIG. 2C depicts an example of a user interface of a digital scene showing a mixed reality (MR) environment, in accordance with embodiments of the present disclosure. The mixed reality environment depicted has AR and BR scenes/objects that are emphasized visually over VR scenes/objects.

Figure 2D:
FIG. 2D depicts an example of a further user interface of digital scene showing a mixed reality (MR) environment, in accordance with embodiments of the present disclosure.

FIG. 2D depicts an example of a further user interface of digital scene showing a mixed reality (MR) environment, in accordance with embodiments of the present disclosure. The example mixed reality environment depicted shows similar emphasis of VR, BR and AR.

Figure 2E:
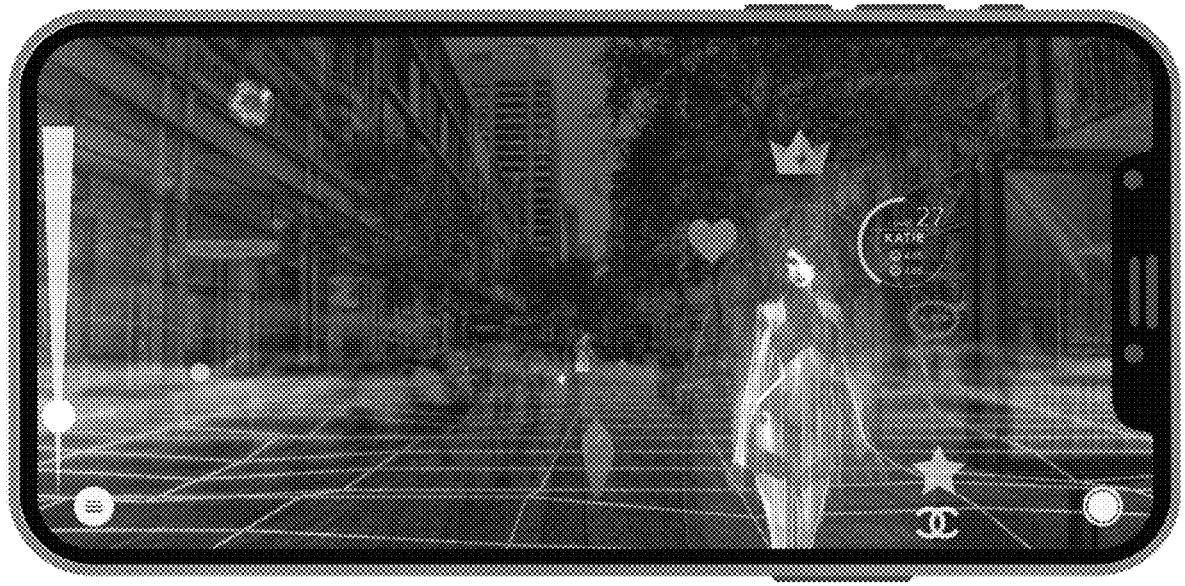
FIG. 2E depicts an example of a further user interface of a digital scene showing a mixed reality (MR) environment, in accordance with embodiments of the present disclosure.

FIG. 2E depicts an example of a further user interface of a digital scene showing a mixed reality (MR) environment, in accordance with embodiments of the present disclosure. The example mixed reality environment depicted shows emphasis of VR over AR and BR scenes/objects.

Figure 2F:
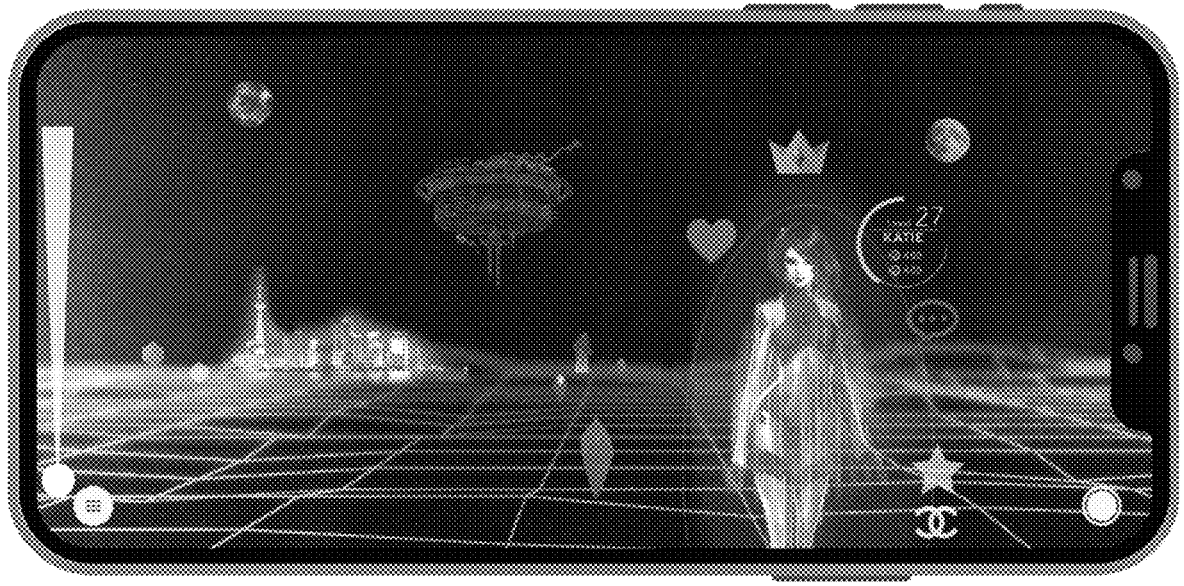
FIG. 2F depicts an example of a user interface of digital scene showing a virtual reality (VR) environment, in accordance with embodiments of the present disclosure.

FIG. 2F depicts an example of a user interface of digital scene showing a virtual reality (VR) environment, in accordance with embodiments of the present disclosure FIG. 3A depicts an example functional block diagram of a host server 300 that facilitates gradual or instantaneous adjustment in levels of perceptibility of virtual objects or reality objects in a digital scene, in accordance with embodiments of the present disclosure.

The host server 300 includes a network interface 302, a virtual reality (VR) object manager 310, a basic reality (BR) object manager 340, an augmented reality (AR) scene generator 350 and/or a transition engine 360. The host server 300 is also coupled to a BR layer/sublayer repository 322, a VR layer/sublayer repository 324 and/or a perceptibility repository 326. Each of the VR object manager 310, the BR object manager 340, the AR scene generator 350 and/or the transition engine 360. can be coupled to each other.

One embodiment of the VR object manager 310 includes, a VR layer/sublayer manager 312, a perceptibility adjustor 314 and/or a virtual reality (VR) scene generator/adjustor 318. One embodiment of the basic reality (BR) object manager 340 includes, a BR layer/sublayer manager 342, a perceptibility adjustor 344 and/or a BR scene generator/adjustor 346.

Additional or less modules can be included without deviating from the techniques discussed in this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 302 can be a networking module that enables the host server 300 to mediate data in a network with an entity that is external to the host server 300, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

One embodiment of the host server 300 includes the VR object manager 310 having, the VR layer/sublayer manager 312 having the perceptibility adjustor 314 and/or the virtual reality (VR) scene generator/adjustor 318. The VR object manager 310 can be any combination of software agents and/or hardware modules (e.g., including processors and/or memory units) able to manage, present, depict, generate, render, store, retrieve, adjust, display VR objects. The VR layer/sublayer manager 312 is able to track, generate, create, modify, manage a VR layer and/or VR sublayers. For example, a VR layer can include multiple VR sublayers. A given VR sublayer can include multiple VR objects. Alternatively, the VR layer can include a single layer which includes multiple VR objects.

The perceptibility adjustor 314 can determine, adjust, modify and/or optimize the perceptibility of a given virtual object (VOB). The perceptibility can be adjusted for different virtual objects in the VR layer. The perceptibility can also be set based on which VR sublayer a given virtual object is associated. For example, a set of virtual objects (VOBs) A associated with VR sublayer A and a set of virtual objects B can have different perceptibility settings or adjustors. In some instances, individual VOBs in a given VR sublayer can also have different perceptibility settings or adjustors. The VR scene generator/adjustor 318 can the adjust, depict, present, render and/or display a digital scene based on the perceptibility settings of the various VOBs and/or the VR layers/sublayers.

One embodiment of the host server 300 further includes the basic reality (BR) object manager 340 having the BR layer/sublayer manager 342, the perceptibility adjustor 344 and/or the BR scene generator/adjustor 346. The BR object manager 340 can be any combination of software agents and/or hardware modules (e.g., including processors and/or memory units) able to manage, present, depict, generate, render, store, retrieve, adjust, display BR objects (or, reality objects). For example, a BR layer can include multiple BR sublayers. A given BR sublayer can include multiple BR objects. Alternatively, the BR layer can include a single layer which includes multiple BR objects.

The perceptibility adjustor 314 can determine, adjust, modify and/or optimize the perceptibility of a given basic reality (BR) object. The perceptibility can be adjusted for different BR objects in the BR layer. The perceptibility can also be set based on which BR sublayer a given BR object is associated. For example, a set of virtual objects associated with BR sublayer A and a set of virtual objects B can have different perceptibility settings or adjustors. In some instances, individual BR objects in a given BR sublayer can also have different perceptibility settings or adjustors. The BR scene generator/adjustor 346 can the adjust, depict, present, render and/or display a digital scene based on the perceptibility settings of the various BR objects and/or the BR layers/sublayers. 'Layers'

In accordance with embodiments of the present disclosure, basic reality (BR) or the basic reality region can be implemented (e.g., by the BR object manager 340 or BR layer/sublayer manager 342, and/or the BR scene generator 346) using information, data, content or objects in a 'basic reality (BR) layer,' or multiple BR layers (or BR sublayers), which can include for example, real content, real information, live or recorded video and still images and audio of the real world.

Virtual reality or a virtual reality region can be implemented (e.g., by the VR object manager 310, BR layer/sublayer manager 312, perceptibility adjustor 314 and/or the VR scene generator 318) using information, data, objects or content in a 'virtual reality (VR) layer,' or multiple VR layers (or VR sublayers), and can include synthetic, or computer generated images.

Augmented reality (AR) or an augmented reality region can be implemented (e.g., by the AR scene generator 350) using information or content in an 'augmented reality layer,' or multiple augmented reality layers (or AR sublayers). Augmented reality can also include a combination of virtual reality layers and basic reality layers. For instance, an AR region can be implemented with varying mixtures (different in amount and perceptibility) of corresponding objects from a BR region and a VR region, via the transition engine 360. Mixed reality can generally include scenes which have differing mixtures or levels or amounts of information/content/data/objects from each of the above described 'layers' or 'sublayers.'

In a further embodiment, user may control which layers, sublayers and content within layers, are visible or in focus via an interactive visual control such as a touchable slider or dial or via a button or by voice commands, gestures, gazes and eye movements, or device gestures or movement, or body movements and gestures, or other ways of giving input to the device. Any location in the physical or virtual world, can have content in these layers of data. Additional layers can be added and/or available as well. Layers can be searched and or filtered. Any data or information can appear in a layer in this interface. Layers can be filtered by users or applications and the content in layers can be generated algorithmically or pulled from APIs or authored and added by users, advertisers, and content providers.

Note different features and capabilities may be available in different layers, sublayers and contexts for users. For example the features and UI capabilities may be different in VR mode from AR mode. The soundtrack and audio and color scheme and other rendering effects may vary across layers or views. Users may save or bookmark or follow a layer, filter, location, virtual object person, avatar, character, any representation of a character/person, or any combination of the above.

Transitioning

The above described layers/sublayers can constitute further dimensions in an application space or in a platform. The disclosed system enables applications, an operating system, or a platform to transition (e.g., as controlled or performed by the transition engine 360) between these different dimensions a user is able to experience between the various dimensions seamlessly. For example, BR to/from AR, BR to/from VR and/or AR to/from VR, including any intermediate points (e.g., MR) in between the regions of BR, VR and AR along the reality—virtual continuum, in any direction to any extent. At the BR extreme a user does not see, detect or observe any virtual content or virtual content is negligible. On the VR extreme you only see virtual content or basic reality object is negligible. The zones in between can be referred to as AR or in some instances MR. Depictions of such example transitions are illustrated in FIG. 2A-2F.

As a further example, the host server 300 (e.g., via the transition engine 360) can render BR as being selectively perceptible (e.g., transparent, opaque or translucent.) In this manner, the virtual objects can become more perceptible. For instance, the host server 300 can adjust perceptibility of the virtual objects (e.g., the virtual world and virtual content) of the scene to be more perceptible until it becomes the foreground and the basic reality objects (e.g., live, streaming or recorded image or video) is gone or almost gone. And system can can go in the other direction.

In the BR transition example, transitions (e.g., by the transition engine 360) also work operate live from a video or still camera or a recorded video or still image. For instance the video camera layer can be adjusted appear to be more or less opaque seeming, relative to virtual objects or objects a virtual reality content layer. The host can make it seem like you are seeing through the physical world as depicted in the video feed to the hidden virtual world "behind it"—similar to an x-ray vision experience.

In embodiments of the present disclosure, the host server 300 (e.g., the transition engine 360) enables transitioning across, between, or amongst the above described different 'layers' of information/content; the host server 300 (e.g., the transition engine 360) also facilitates transitioning or selecting discrete points or discrete regions in the real-virtual continuum of reality vs. virtualness.

In general, any given scene can have varying levels of perceptibility of each or any number of the above layers and/or sublayers. The level of perceptibility of each layer in some instances, can be adjusted individually, on a continuum (sliding scale) or to discrete levels which may be preset or predetermined. For example, for a given layer, the visual perceptibility can be represented by a level of translucence of the corresponding objects in the layer, and the audible perceptibility can be represented by or adjusted by a level of volume of the corresponding objects in the layer.

For a low perceptibility level selected for the virtual layer, the corresponding virtual objects can be depicted with higher translucence allowing the other objects (e.g., simulated and/or reality objects) to become more visible. The volume for the sounds associated with such virtual objects can also be lowered allowing sounds associated with other objects (reality objects or simulated objects) to become more pronounced. Visual perceptibility levels (e.g., translucence levels) and audible levels may each have its control function, in each layer, each layer and/or sub layer can have its own level adjustor. In some instances, multiple layers can have one common adjustor.

In some embodiments, the adjustment is on a single continuum scale or selection of discrete levels that correspond to a level of 'virtualness,' in addition to or in lieu of tweaking the perceptibility level of individual sublayers or layers. Note that the transitions enabled in the system can begin and end at any point in the real-virtual continuum, and the transitions can be in any direction (towards increased virtualness or towards decreased virtualness). Specifically the host server 300 (e.g., the transition engine 360) can present a given scene in the user interface with any combination/mixture of perceptibility of virtual objects and reality objects. The combination/mixture is then adjustable or configurable such that its reality objects are more perceptible or the virtual objects are more perceptible, or vice versa.

In a further embodiment, discrete points in the real-virtual continuum can be implemented (e.g., by the transition engine 360) by turning on or off the visibility of other layers, instead of smoothly changing the perceptibility (e.g., translucency, opacity, transparency, and/or volume). In this example of defining a mixture or ratio, such that they appear in that ratio of translucency (including the case where the AR objects are opaque and are on top of or appearing in the BR scene, to the case where the VR scene and the BR scene are mixed together so that they both appear or such that one is more visible than the other, Note further that the layers as described above can include multiple different layers within. For example, basic reality layer can include or depict multiple sub-layers of real content within the basic reality layer (e.g., visual, infrared, ultraviolet spectrum—or gray scale, black and white vs. color); a virtual realty layer can include different sub-layers of virtual content (some layer we call AR, another layer we call AR2, another layer we call VR and another we call VR2, etc.); or a further augmented reality layer to include multiple sub layers which include one or more of AR, AR2, AR3, and/or AR4. Any number of the sub-layers can be associated with perceptibility adjustor to adjust its visibility (e.g., opacity, translucency, etc.) and/or audibility such that different layers or sublayers can be depicted or presented relative to one another at a mix of different perceptibility levels (e.g., opacity levels).

Note that such information/content is generally related to a user or devices' associated location(s)/location range(s), and/or time and may be further relevant based on profile and/or context and/or interests and/or intent; visual or audible features/content/information can appear and/or disappear in the UI. Such transition can be gradual or instantaneous.

In some embodiments, the layers, sublayers or any number of the individual object can be associated with its own perceptibility adjustment or settings. For example, any number of individual virtual object in the digital environment can have its own visibility level adjustor and/or audibility adjustor. Furthermore, a visibility level adjustor can include any number of multiple parameters (e.g., color, sharpness, brightness, opacity, translucency, etc.). An audibility level adjustor can also include any number of multiple parameters (e.g. bass, treble, volume, surround, stereo, etc.) The adjustors may also be for a group of virtual objects.

Similarly, each reality object or each basic reality object can also have its own associated visibility level adjustor and/or audibility adjustor. There can also be adjustors that apply to a group of reality objects. In a further embodiment, each of the basic reality layer, augmented reality layer and/or the virtual reality layer can be associated with own perceptibility adjustor setting(s). Note that in general, a combination of layer-specific perceptibility adjustments can be used or implemented with object specific or object-group specific perceptibility adjustments.

In general, these adjustors can cause an object to visually disappear permanently or temporarily and/or be permanently or temporarily muted in a digital environment.

Example Transitions

Transitions in the real-virtual continuum (e.g., as carried out by the host server 300 and/or the transition engine 360) includes transitioning amongst the following regions/discrete points:

(1) a live or recorded image/video of the real world (with or without associated audio), that does not include depictions of virtual objects, virtual environmental features, or virtual sounds, to/from, (2) a live or recorded image/video of the real world (with or without associated audio as well), that includes depictions of one or more virtual objects, virtual environmental features, or virtual sounds, to/from, (3) a computer generated/synthesized image/video of a virtual environment, which includes depictions of one or more virtual objects or virtual environment features or virtual sounds, and which may or may not also include one or more live or recorded images/video of the real world (with or without associated audio as well and at any perceptibility level).

Another example includes a transition between:

a) live or recorded images of the real world (BR) without any AR/VR, to/from b) live or recorded images of the real world (BR) combined with AR/VR content, to live or recorded images of a virtual world (VR) that is not combined with live or recorded images of the real world (BR)—and all points on the spectrum between these extremes. So BR, BR+AR, VR.

Further examples include transitions between the following points:

A live or recorded image of a real world environment without the addition of any synthetic AR/VR content—it is just the actual world as it appears through a display on a device where the user is located (and which may or may not use "video" technology to capture and display it).

a live or recorded image of a real world environment in of a user, where there is the addition of synthetic AR/VR objects and environmental features in the image, such that the synthetic content is incorporated into the image (in any ratio of perceptibility mixture, such as more real world content to less AR/VR, or more AR/VR to less real world content)

a live or recorded computer generated image (or a live or recorded image of a computer generated image—such as video of activity in a virtual world that is recorded by a user's device) that depicts a virtual environment (such as a virtual world or a synthetic dimension of the physical world), which may or may not correspond to the real world or its phenomena, and which may or may not contain depictions of real world (non-synthetic) environments or objects (for example within a virtual world there can be a virtual object that contains or depicts a live or recorded video or photo image of a real world location or person or thing).

Further Examples:

In a desktop environment, platform or OS user interface, a real video/webcam stream can be made more translucent and then the normal desktop appears. The platform or desktop can be made more translucent and the live video appears. In addition, apps on top can be more or less translucent. For example, a video game can have its own adjustment setting in the digital environment.

For instance, user can be checking emails or text AND be looking at wife or dinner date or friend at the same time. Users can also be playing a video game while looking at their girlfriend in live time and/or speaking to them. Also less tripping over the curb while texting and walking when there is an image or video of the surrounding environment—in this example, the video of the surrounding environment may be turned off or switched to be less perceptible when the user reaches a cafe and sits down and is at less risk for tripping while texting and walking.

Enhancements

In further embodiments: virtual objects can include virtual 'windows.' For example, a virtual object (as managed by the VR objected manager 310) can also be a virtual container such as a window or virtual desktop, or collection of objects, or of any app (like a video player or a game or a software app like PowerPoint). A virtual object could can include a view into a location in another layer and/or object. So a layer could include an object that shows what is happening at a place (a user's current location or another location) in another layer, such as a wormhole. Users can step into it to go to that view of that place, or it could trigger a different mix in your present view. A shortcut to a mix could be triggered from an object that can change the present mix and/or location.

Note that in some instances and applications, the basic reality objects or the 'reality objects' (e.g., as managed by the BR object manager 340) can include synthetic representations of real world actual objects that are detected. Reality objects can further include the case where where reality objects are not special objects but rather are just images of reality itself (such as live or recorded video or camera content, without additional synthetic content or synthetic objects like AR/VR content). In the former case, a basic reality object is an object that is detected by an imaging device such as a sensor (e.g., camera, etc.), and then recognized by machine learning systems such that they are extracted as distinct objects in a scene, and can then be tracked, and labeled as certain named entities, and can be rendered and interacted with via a software application and a display. In other words, a scene comprised of basic reality object can be artificially constructed using objects detected as reality objects via computer vision systems or via machine learning of a given scene or object.

Note that as an enhancement, basic reality objects objects), or the basic reality layer includes post-processed video or images. Specifically, the disclosed system can detect and recognize "objects" through machine learning or computer vision, in the video or camera images and treat them as objects—such that even though a live or recorded image looks exactly like video or a camera photo, it is actually assembled out of or at least decomposable to distinctly detect or identify photorealistic objects present in a given scene of a digital environment. In general, renderings of basic reality (BR) can be as simple as a normal video or camera image of the world as it appears on any phone or display.

FIG. 3B depicts an example block diagram illustrating the components of the host server 300 that facilitates gradual or instantaneous adjustment in levels of perceptibility of virtual objects or reality objects in a digital scene, in accordance with embodiments of the present disclosure.

In one embodiment, host server 300 includes a network interface 302, a processing unit 334, a memory unit 336, a storage unit 338, a location sensor 340, and/or a timing module 342. Additional or less units or modules may be included. The host server 300 can be any combination of hardware components and/or software agents to facilitates gradual or instantaneous adjustment in levels of perceptibility of virtual objects or reality objects in a digital scene. The network interface 302 has been described in the example of FIG. 3A.

One embodiment of the host server 300 includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 includes a memory unit 336 and a storage unit 338. The memory unit 335 and a storage unit 338 are, in some embodiments, coupled to the processing unit 334. The memory unit can include volatile and/or non-volatile memory. In virtual object deployment, the processing unit 334 may perform one or more processes related to facilitating gradual or instantaneous adjustment in levels of perceptibility of virtual objects or reality objects in a digital scene.

In some embodiments, any portion of or all of the functions described of the various example modules in the host server 300 of the example of FIG. 3A can be performed by the processing unit 334.

Figure 4A:
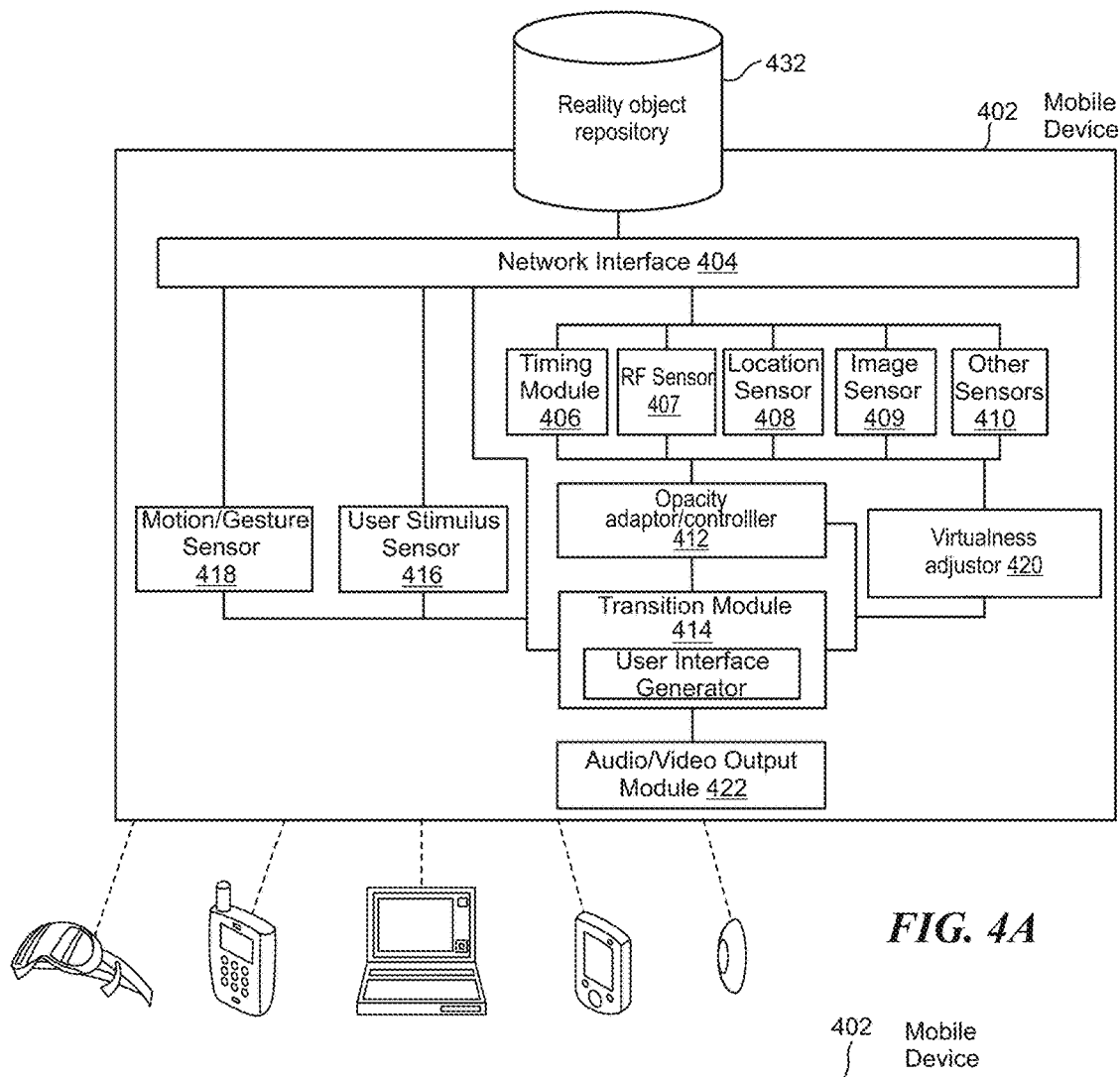
FIG. 4A depicts an example functional block diagram of a client device such as a mobile device that facilitates or depicts transitioning in virtualness level for a scene, in accordance with embodiments of the present disclosure

FIG. 4A depicts an example functional block diagram of a client device 402 such as a mobile device that facilitates or depicts transitioning in virtualness level for a scene, in accordance with embodiments of the present disclosure.

The client device 402 includes a network interface 404, a timing module 406, an RF sensor 407, a location sensor 408, an image sensor 409, an opacity adaptor/controller 412, a transition module 414, a user stimulus sensor 416, a motion/gesture sensor 418, a virtualness adjustor 420, an audio/video output module 422, and/or other sensors 410. The client device 402 may be any electronic device such as the devices described in conjunction with the client devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, smart lens, monocles, smart glasses/goggles, wearable computer such as mobile enabled watches or eyewear, and/or any other mobile interfaces and viewing devices, etc.

In one embodiment, the client device 402 is coupled to a reality object repository 432. The reality object repository 432 may be internal to or coupled to the mobile device 402 but the contents stored therein can be further described with reference to the example of the reality object repository 132 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the client device 402 to mediate data in a network with an entity that is external to the host server, through any known and/or convenient communications protocol supported by the host and the external entity. The network interface 404 can include one or more of a network adapter card, a wireless network interface card, a router, an access point, a wireless router, a switch, a multi-layer switch, a protocol converter, a gateway, a bridge, bridge router, a hub, a digital media receiver, and/or a repeater.

According to the embodiments disclosed herein, the client device 402 can facilitate or depict transitioning in virtualness level for a scene.

The client device 402 can provide functionalities described herein via a consumer client application (app) (e.g., consumer app, client app. Etc.).The consumer application includes a user interface that enables the transitioning in virtualness level for a scene. The virtualness adjustor 420 can for example receive user input on how to adjust the virtualness levels for a given digital scene.

Figure 4B:
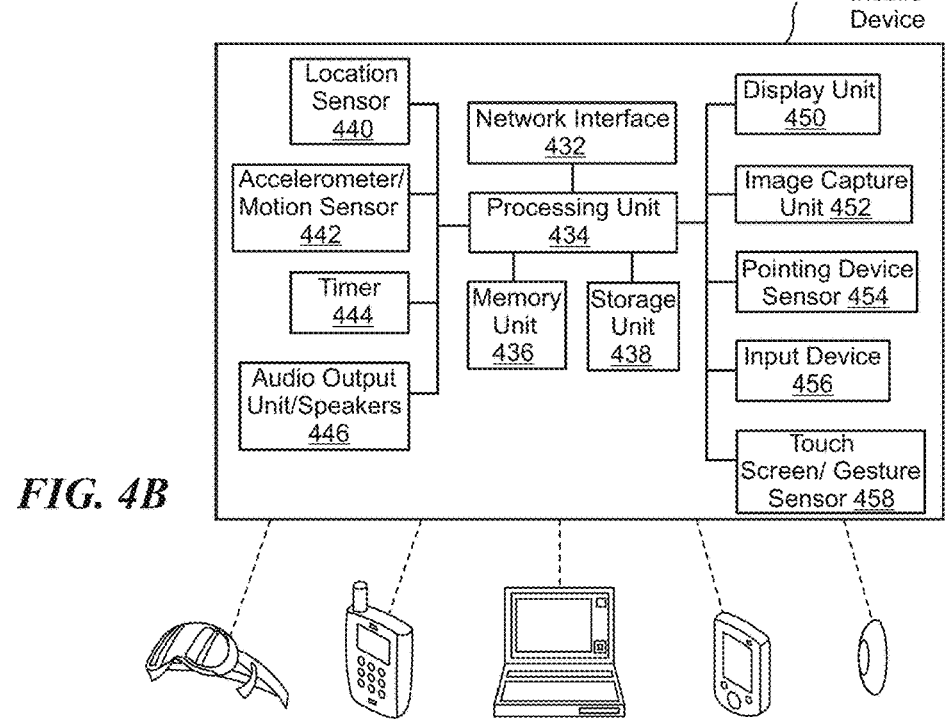
FIG. 4B depicts an example block diagram of the client device, which can be a mobile device that facilitates or depicts transitioning in virtualness level for a scene, in accordance with embodiments of the present disclosure.

FIG. 4B depicts an example block diagram of the client device 402, which can be a mobile device that facilitates or depicts transitioning in virtualness level for a scene, in accordance with embodiments of the present disclosure.

In one embodiment, client device 402 (e.g., a user device) includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, an input device 456, and/or a touch screen sensor 458. Additional or less units or modules may be included. The client device 402 can be any combination of hardware components and/or software agents for facilitating or depicting transitioning in virtualness level for a scene. The network interface 432 has been described in the example of FIG. 4A.

One embodiment of the client device 402 further includes a processing unit 434. The location sensor 440, accelerometer/motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the client device 402 for example, via the image capture unit 452, pointing device/sensor 454, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In rendering or presenting an augmented reality environment, the processing unit 434 can perform one or more processes related to facilitating or depicting transitioning in virtualness level for a scene.

In some embodiments, any portion of or all of the functions described of the various example modules in the client device 402 of the example of FIG. 4A can be performed by the processing unit 434. In particular, with reference to the mobile device illustrated in FIG. 4A, various sensors and/or modules can be performed via any of the combinations of modules in the control subsystem that are not illustrated, including, but not limited to, the processing unit 434 and/or the memory unit 436.

Figure 5:
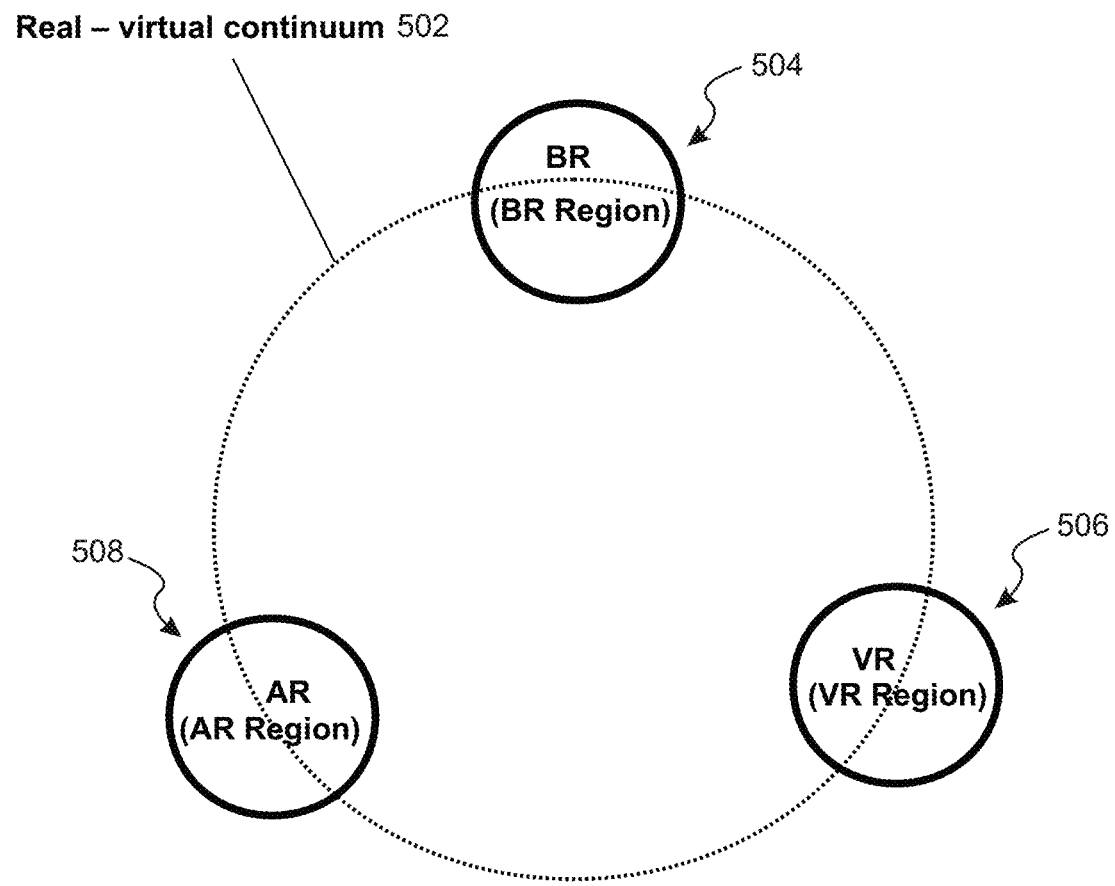
FIG. 5 graphically depicts an example representation of the real-virtual continuum, in accordance with embodiments of the present disclosure.

FIG. 5 graphically depicts an example representation 502 of the real-virtual continuum, in accordance with embodiments of the present disclosure.

The virtualness of a digital scene (e.g., digital environment, scene) can be implemented in a continuum of levels corresponding to levels of virtualness or at any number of discrete levels or discrete regions (e.g., BR region 504, AR region 508, or VR region 506) corresponding to mixtures of virtual object, reality objects and/or simulated objects (relative virtual objects) presented at varying perceptibility levels.

Any number of discrete levels or discrete regions can exist and be defined in the continuum. The discrete levels or discrete regions can be predetermined by the system for the platform as a whole, or they may be predetermined based on application. A discrete region (e.g., BR region 504, AR region 508, or VR region 506 illustrated in FIG. 5) generally includes multiple levels of virtualness. The discrete levels or discrete regions can be user defined/specified and may be configurable or adjustable or automatically adjusted or adaptable to various scenarios.

Examples of discrete regions such as those illustrated in FIG. 5, in such a real—virtual continuum can include, for example:

basic reality ('BR' or 'BR region 504')—BR is comprised only of or mostly of reality objects/basic reality objects, as illustrated in the example screenshot of FIG. 2A. BR in a digital environment typically includes little or minimal virtual or simulated content or objects. In general, renderings of basic reality (BR) can be as simple as a normal video or camera image of the world as it appears on any phone or display.

virtual reality ('VR' or 'VR region 506')—VR can be comprised of only or mostly of virtual objects, with little to no basic reality objects, as illustrated in the example screenshot of FIG. 2F.

augmented reality ('AR' or 'AR region 508')—AR can be comprised of virtual objects (which can include relative virtual objects/simulated objects) and 'virtual objects' are depicted amongst the basic reality objects, as illustrated in the example screenshot of FIG. 2B.

When the depiction includes some intermediate mixtures of basic reality objects, and virtual objects—this can be referred to as 'mixed reality (MR),' as illustrated in the example screenshots of FIG. 2C-FIG. 2E. Note that in any of the continuum, additional layers of information or content can be presented.

Virtual Reality (VR) Region Nuances—Traveling Within VR and Amongst VR and Other Realms When you are in VR region you can move around in VR by flying—or walking—virtually. Not necessarily physically. So you enter the VR world from a physical real world place, but the using another control (like gestures or moving your phone around in the air, or some controller, or using graphical controls that appear on the screen) you navigate yourself (your avatar) through the VR world. You do not have to physically walk to do it. So in the image sequence—the last image which is VR—the user could fly over the planet in the sky or to the distant virtual city—without physically moving. They can interact with other virtual participants—including those who come in from other physical locations or from the Web or other apps. Then when they exit the virtual layer, they return back to their physical locations—and if they changed physical location they will return back to their present physical location not their previous one (when they entered VR).

In this manner, the system does not require real people to navigate the VR region/layer physically in the real world because for example they might bump into a tree or a telephone pole that is actually there in the real world but not appearing in the VR mode.

Note that however the system enables it as an option. If we let people physically navigate in the VR layer by walking in the real world for example, we would need to show some kinds of outlines or warnings when they are doing things like walking near obstacles or stepping into traffic etc.

The example scenario is that users physically navigate/travel in BR and AR, but when you get all the way to 100% VR you are no longer constrained to your actual physical location. You can fly, swim, jump—you are like a ghost or a spirit or a superhuman—you can travel as a spirit so to speak—you can interact with the hidden layer of the world—including with things and people and other non-player characters that are there and are only visible on that layer. But most importantly is that you can also—in 100% VR mode—go to other places—the other VR worlds that have no connection to any actual physical place, or to other locations in VR layers that do correspond to physical places—both are possible.

When a user decides to exit the VR layer, by for example using the slider to slide back up to AR (which is only one of many ways that one might exit or change modes), we have to explain what happens. For example suppose you are at location A in the physical world and you go from BR to AR to VR. Then in VR you fly over to the VR location that corresponds to location B in the physical world. Then you slide back from VR to AR to BR. But you are still at location A . . . so what happens? In that situation as they slide back the things that appeared in VR from location B no longer appear and they start seeing things from location A in AR and BR.

There is another scenario where you enter VR from location A. Then in the physical world you stop using your device but it is still in VR mode and Then you walk in the physical world to location B. Then you look at your device again. Now the VR mode shows you the VR from the perspective of location B in VR, where you now are. But once you enter VR you can move around without walking in physical space. So in other words when you go from BR to VR it is relative to your physical location. But once you are in VR it doesn't have to rely on your physical location. However when you exit VR you return to your physical location. Note that VR can enable people to interact with people and things who are not at or associated with a physical location. But AR only allows interaction with people and things that are associated with physical space. Another way to think about it is there are wormholes from BR to VR. But once you are in VR you can travel to other places in VR but you are only a ghost.

Figure 6A:
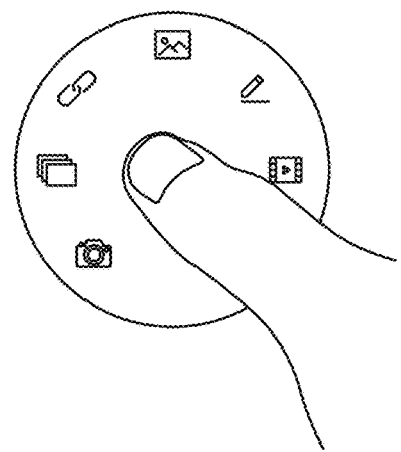
FIG. 6A-6C graphically depict multidimensional user interfaces for facilitating user interaction, in accordance with embodiments of the present disclosure.
Figure 6A:
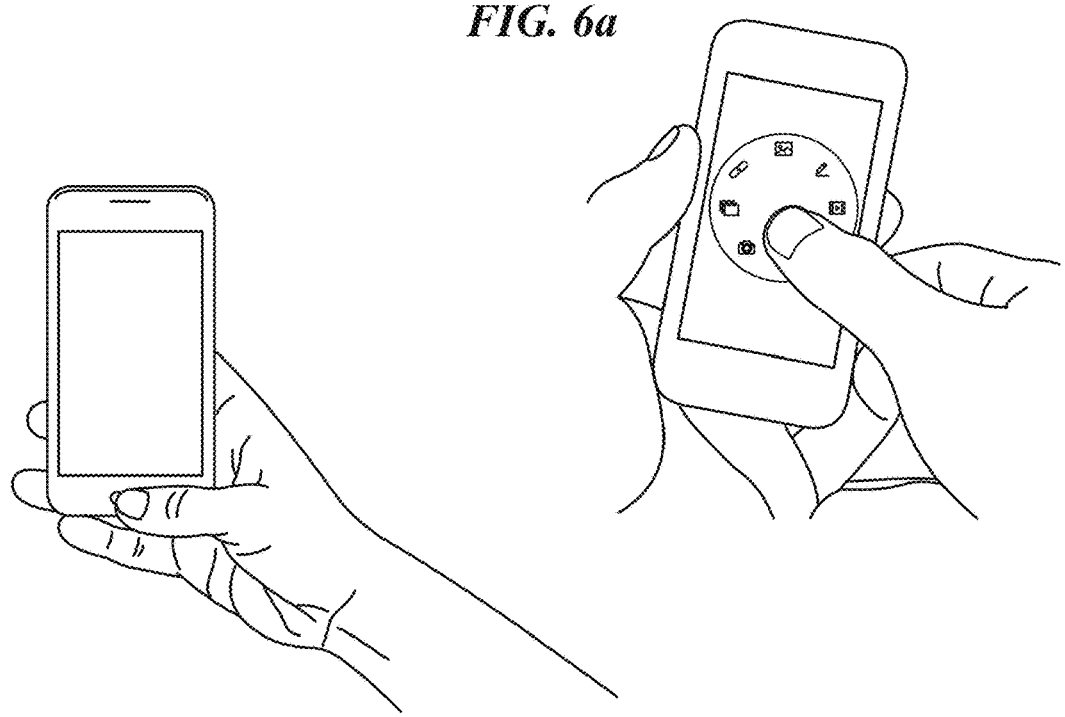
Figure 6B:
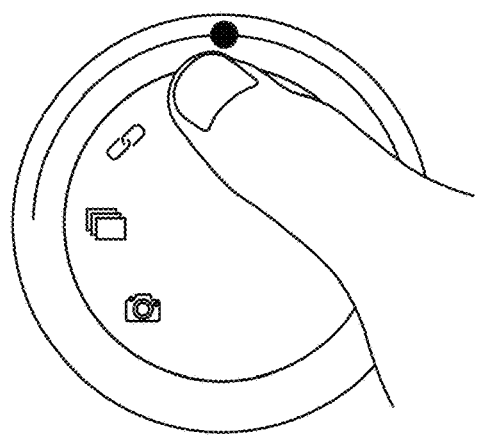
Figure 6C:
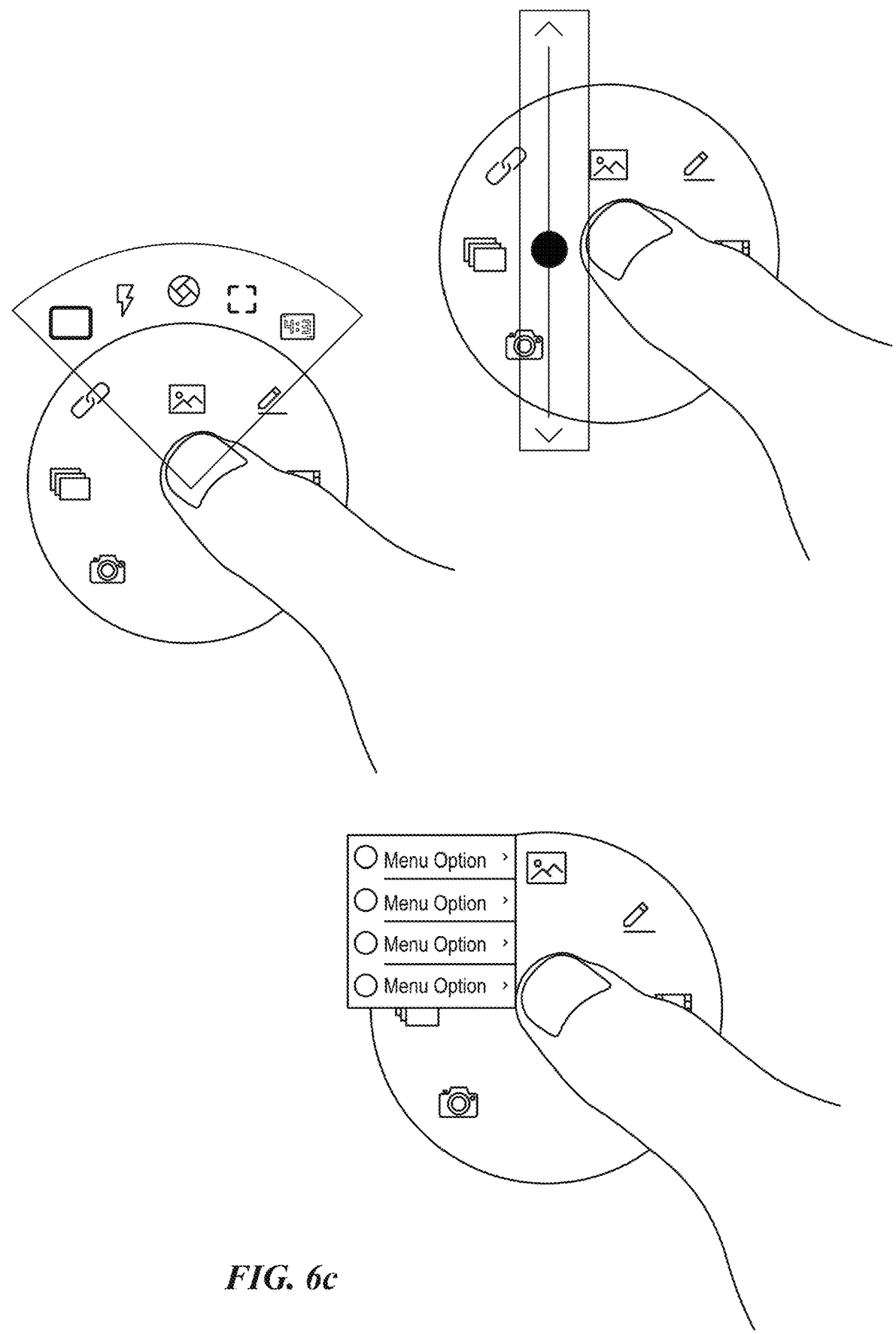

FIG. 6A-6C graphically depict multidimensional user interfaces for facilitating user interaction, in accordance with embodiments of the present disclosure.

Embodiments of the present disclosure further include gesture, audio and/or gaze centric enabled user interface controls. The present disclosure includes systems and apparatuses of a user interface that is multidimensional (2D, 3D, or more) and methods to facilitate user interaction.

The disclosed innovation can detect the focus of user intent or action via an input receiver (e.g., which may be a display or accessed using a device display or screen, mouse, trackpad, body or gesture tracking unit, and/or an audio receiver such as a microphone). Such user intent or action can also be detected by or via eye wear, any wearable device, head mountable device, smart garments, or lens (e.g., smart lens or smart contact lens) which can be part of the system.

The disclosed system can further render, depict, present or show visually or audibly, a menu of options at that location, and then can enable a user to make choices to, for example, launch/initiate actions or open further menus at that location via the input receiver such as the display or other types of devices. Example embodiments of the interface functions rendered by the disclosed system are illustrated in FIG. 6A-FIG. 6C.

In some embodiments, a tree of various control interfaces and options can be implemented and used in any device to implement this user interface. This user interface can work in any display device (computer, mobile phone, camera, wearable device, smart wearables, smart garments, smart lenses or smart contact lenses, television or flat panel display, monitor, heads up/head mounted display, projection system, device display) that can detect a users intended location through a pointing device (the pointing device being, physical or digital, like a mouse or wand or pointer, or handset controller) or a touch sensor (touchscreen or touch sensitive display, mouse-pad, or touch sensitive surface) or a gesture detection system (e.g., hand, finger, arm, head, torso, limbs, etc.) and/or a gaze detection or eye detection system (that detects where a user is looking or how their eye(s) or parts of their eyes (e.g., eyeball, pupils, eye foci point, eye lid, etc.) may be moving).

An example embodiment is that the user interacts with, talks at/to, touches (or gazes at) a place or otherwise interacts with or cause an interaction with via an input receiver (e.g., audio receiver, screen, display or other types of devices). For example, the user's selection can stay on focus by audio command or the user touch or gaze can stay there (hovers) or near a screen or display area without substantially moving—the location of a pointer or another tracker as controlled by voice, sound, noise, audible command, gesture and/or gaze (e.g., fingers, hands, eyes, torso, head, limbs, etc.—for a short amount of time, for example, 10 ms, 20 ms, 50 ms, 1 second, etc), to enter or launch a "control mode."

The system can detect certain actions, pattern of actions, spoken words or commands as this causes a pause at a location as a command to "enter control mode" and can further prompt the user. For example the system can pop-up a visual user interface and/or an audio user interface containing a set of choices (a "control") under their finger or at the place they are gazing.

Moreover, the control mode can be initiated or launched through detection of a gesture, or a gesture pattern or a specific gesture (like tapping twice on an empty place, pressing an actuator (e.g., via a pressure sensitive screen or device) with different force levels to access different features or functions, or pushing/tapping twice with force feedback, gesturing involving one or multiple fingers or a specific combination of fingers, and/or pinching multiple fingers such as their thumb and forefinger on empty space, etc.), or via detection of keyword(s), phrase(s) provided audibly, sounds, noises, and/or an audio command spoken by a user or a machine like saying "open a menu". One feature might be that when the user is touching the device such that it is in control mode, and they speak, it knows to interpret what they say as a command.

In the control mode, the particular control—and the choices that appear in the control, or the order in which they appear, or the sequence in which further controls or panels can be rendered or presented—can be contextually related or relevant to what is appearing at that location (under their finger or gaze) on the display and/or who the user is, what their profile is, what actions they have already taken, their location, the time, the application they are using, and information about their interests or intent. In addition, suggested or paid options can appear.

The control panel or functions that appear or is rendered, displayed or otherwise depicted can be in any of many different forms depending on the application—for example it can include a graphical selection wheel, diagram, a pictogram/pictograph, a menu, a list of icons, emoticons, gifs, or a set of options arrayed in a stack or fan out shape, or a control slider (for example for volume or intensity), a tuning knob, a set of switches and knobs and sliders (like on an audio mixing panel for example), a 2D x-y coordinate plane that the user can move a point in or can set multiple points in, or a series of concentric selection wheels, or any of the above depicted in 3D.

In addition, any other graphical and/or audio control interface for soliciting user input or a facilitating a user choice or set of user choices or commands can be displayed as the control, within the control, or from the control. The controls and control sequence can be contextually aware or intelligent. For instance, based a given user action, user response, or selection, the disclosed system can intelligently determine which visual (e.g. graphical) and/or audible prompt to be presented to the user, in a continuous fashion over multiple selections or user replies.

In some instances, as long as the user does not pick up their finger (or gaze away from the control, if using gaze), or otherwise shift a selection or a pointer, the system can remain in "control mode" and can then continue to operate the control object. While in control mode, the control object can render, depict or provide a set of next possible actions—which can appear as a visual prompt including graphic icons, items in a list or menu, or special control widgets like a slider, and/or an audio prompt, for example. While in control mode actions, movements or gestures by the user are interpreted as movements that control the selected control option or are interpreted in the context of the last selected control option.

To initiate, launch, activate or open a sub-control, from any selected control, the user can perform an action, e.g., a user can gesture or move/slide their finger or shifts their gaze from the center of the control to the symbol or string that signifies the next control option they want to select, and when they do that, that next control option activates. The new control can also be activated by audio. For example by the detection of key words or phrases rendered audibly (by a user or machine) or by audible commands.

In one example, the new activated control becomes the new focus point and then it presents users with relevant options to take from there. The previous (parent level) control can remain open or close, behind it or near it. If it remains open that facilitates going back in the hierarchy of controls. In some instances, new or subsequent control panels that are depicted or presented are automatically selected or determined based on.

In a further example, when a control option is selected, it can launch a command or action on the device, or it may open a next-level control or a previous control, with a new set of control options—for example a sub-menu or sub-control interface, or a parent menu or parent-control interface.

When the user gestures, moves their finger or gaze back from sub-control (sub-menu) to a previous level control (from a sub-menu to a parent menu or from a sub-control back to it's parent control) in this interface, it can cause the sub-control to close. Similarly, audio words, phrases or commands can be used to implement such controls.

For instance, if a user selects another control from the a control interface then it can open that selected control. When the user makes a selection that signifies choosing a final command in a tree of controls and commands, it terminates the control mode process and it activates that chosen selection and closes the controls and sub-controls that have appeared. For example if the user navigates, using any of the above described methods, through a sequence of controls and sub-controls to a final menu choice like "take photo" then the application or device closes all the controls and takes a photo.

If the user gestures, moves their finger or gaze off of all of the controls that have opened in this process, into empty space, under the condition that they are not in the mode of a particular selected sub-control (such as control brightness), then it can close all the controls. Controls can also be closed by detection of audible words, phrases, sound(s), noise(s), and/or commands. To exit control mode the user can pick up their finger from the surface, remove their gaze from the region of the control object, or otherwise shift a pointer on a screen from a certain position, and/or make gesture or give a command similar or equivalent to "exit control mode."

In a further embodiment, to select a choice while in control mode the user moves their finger or gaze onto an option in the control or a sub-control—and then they can continue (e.g., if the chosen option allows it) to move their finger or gaze within the field of the display to further adjust whatever that selected control option does (for example up/down can be brightness, left/right can be zoom). If the user is using gaze instead of finger they can optionally make selections by blinking or gesturing with the eyes while hovering the gaze on an object. Audio signals including words, phrases and or commands can be used to affect selection of UI features or to effect certain actions. In some instances, audio signals can be used to perform actions in the application without the need for a visual user interface, for instance, in a pure audio user interface or an audio enhanced visual user interface. A user can speak with (e.g., engage in a dialogue with) or talk at the system for it to perform a desired task or to guide it through a sequence of tasks.

Furthermore, the disclosed system and method to facilitate user interaction via an audio and/or visual user interface can include intelligence or otherwise artificial intelligence (AI) enabled. The depicted or presented audio and/or visual UI may be contextually, temporally and/or spatially relevant. The flow through user interfaces or the sequence with which user interfaces are presented, depicted, activated or launched can be intelligent, for example either based on user response, user preference, prior or historical user actions, user selection in a current UI, and/or coupled with contextual, temporal and/or spatial awareness.

In some instances, the system can predict a user selection or action before it is made, while it is being made or before it is fully completed. For example, based on the direction of a pointer movement, direction of eye or gaze movement, finger movement, part of a gesture, or certain words (detection of pronunciation), parts of phrases or parts of commands that may are audibly rendered, the system can proceed to perform a predicted action. Such prediction can be performed when a certainty threshold has been exceeded or falls within a tolerable range. Such thresholds can be user adjustable, system adaptable (user override-able), and/or application specific (user overridable). Such thresholds, threshold ranges or categories of tolerable ranges can be refined through learning.

Another option is that while in the context of a particular choice within control mode, the user can move a receiver or their device to operate whatever that choice allows. For example, if they use control mode to select a particular choice they can then move their device to control some operation—for example by sensing the velocity, angle, gyroscope output, geo-position, or other orientation or movement of the device as way to input to the chosen control.

To close the controls without selecting any option, user can, for example, move their finger or gaze into empty space instead of onto any point or choice on any open control, and then lift it up. If they are already in a mode from a choice then they lift their finger up from the display to exit control mode and that choice. If they are using gaze then they move their gaze rapidly (a gesture with the eyes), or break their gaze (by blinking twice for example).

If a user moves their finger or gaze from a sub-control back to a parent control it closes the sub-control and activates the parent control—and it can activate the specific choice on that parent control and open a new sub-control for that option. If the user moves their finger of gaze from any particular child control to a parent control—even one several levels higher than it in the sequence of sub-controls (sub-menus) then it skips back to that control and closes all the child controls beneath it (in other words they can jump to a previous level of the sequence of sub-menus and this closes all the sub-menus beneath that level).

Users can also cause the applicable audio sound, noise, words, phrases or command to be created, generated, or played back to effectuate a given action or any part of a sequence of actions with respect to one or more user interfaces. The above disclosed user interface actuation methods can be applied to or used with any visual and/or audio user interface in a digital or online environment including mobile user interfaces, operating system user interfaces, gaming user interfaces, various desktop or mobile applications and/or virtual realty, augmented reality, basic reality and/or mixed reality interfaces of an augmented reality platform or a legacy platform.

Figure 7:
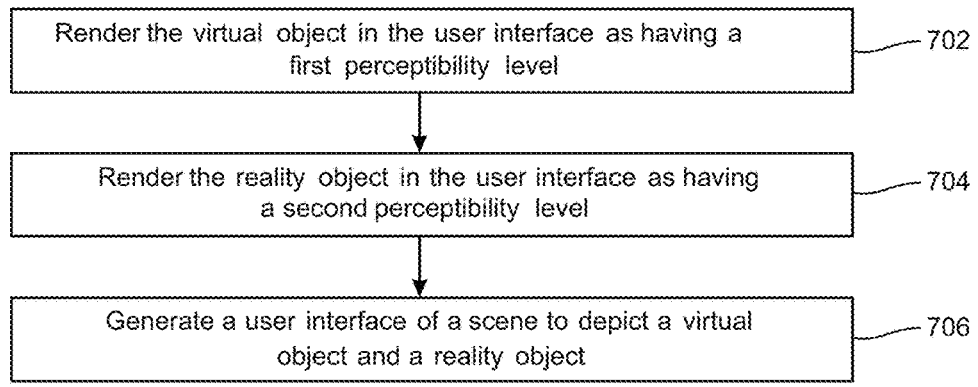
FIG. 7 depicts a flow chart illustrating an example process to adjust the perceptibility levels of a virtual object and a reality object, in accordance with embodiments of the present disclosure.

FIG. 7 depicts a flow chart illustrating an example process to adjust the perceptibility levels of a virtual object and a reality object, in accordance with embodiments of the present disclosure.

The virtual object can be rendered in the user interface as having a first perceptibility level, in process 702. The reality object can be rendered in the user interface as having a second perceptibility level, in process 704. In general, a reality object can include, for instance, a photorealistic depiction of a physical object in a real environment associated with the scene.

The first perceptibility level includes levels of human perceptibility. The second perceptibility level can also include levels of human perceptibility. Note that varying levels/degrees of human perceptibility generally include perceptibility by any of the five senses, including but not limited to:

visibility: represented or adjusted by opacity, translucency, transparency, brightness, sharpness, contrast, etc.; and/or audibility: represented or adjusted by volume, bass, treble, etc.

The first perceptibility level and/or the second perceptibility are adjustable. In addition the first perceptibility level can be independently adjustable in relation to the second perceptibility and the second perceptibility level can be independently adjustable in relation to the first perceptibility. In one embodiment, one or more of the first perceptibility level and the second perceptibility is adjusted through opacity or translucency.

Note that one or more of the first perceptibility level and the second perceptibility level is adjustable by a user and the user can be physically located in the real world environment. The first perceptibility level and/or the second perceptibility level can also be adjustable by a system platform, operating system or application, or be adjustable through device settings on a device on which the user interface is rendered.

In process 706, a user interface of a scene is generated to depict a virtual object and a reality object. In one example, the scene includes an augmented reality environment associated with real environment where the virtual object depicted in the scene is temporally relevant to real phenomenon in the real environment. The scene can also include an augmented reality environment associated with real environment where the virtual object is temporally relevant to real phenomenon in the real environment or the virtual object is spatially relevant to a real entity in the real environment. The scene can also include an augmented reality environment associated with real environment if and when the virtual object is contextually relevant to phenomenon in the real environment.

In a further embodiment the scene includes a virtual reality environment, for example, where the virtual object is irrelevant and uncorrelated to the real environment, the first perceptibility level of the virtual object is of a finite level and the second perceptibility level of the reality object is unobservable (e.g., unobservable or not detectable by a human) or negligible (e.g., detectable but negligible).

In a further embodiment, the scene includes a basic reality environment, where the second perceptibility level of the reality object is of a finite level and the first perceptibility level of the virtual object is unobservable or negligible.

The first perceptibility level and/or the second perceptibility level are adjustable by a user accessing the scene via the user interface, using control features in the user interface. The control features include, for example, a touchable slider, dial or button. The control features can also include one or more of, voice control features, gesture control features, body movement control features. The control features can also be actuated by one or more of, gaze detection or eye movement detection features.

Figure 8:
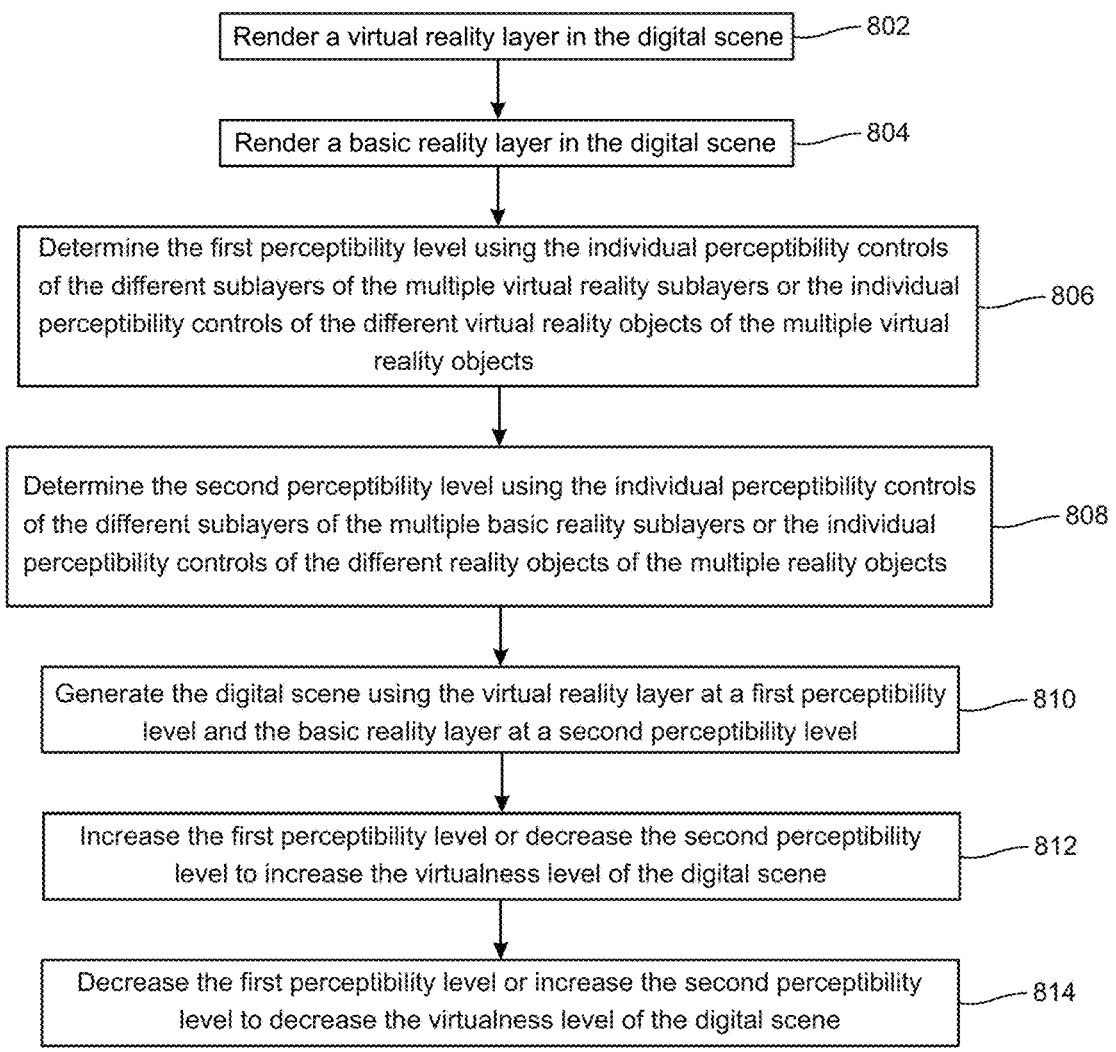
FIG. 8 depicts a flow chart illustrating an example process to adjust a virtualness level of a digital scene, in accordance with embodiments of the present disclosure.

FIG. 8 depicts a flow chart illustrating an example process to adjust a virtualness level of a digital scene, in accordance with embodiments of the present disclosure.

A virtual reality layer is rendered in the digital scene, in process 802. The virtual reality layer can include one or more virtual objects. A basic reality layer is rendered in the digital scene 804. The basic reality layer comprises one or more reality objects. In general, the reality objects can include photorealistic depictions of real world phenomenon in a real environment associated with the digital scene.

The digital scene can for example, include, an augmented reality environment when the first perceptibility level is of an observable level and the second perceptibility level is of an observable level. In one embodiment, the second perceptibility level of the basic reality layer can be switched to off or to negligible perceptibility to generate a virtual reality environment in the digital scene. Additionally. the first perceptibility level of the virtual reality layer can be switched to off or to negligible perceptibility to generate a basic reality environment in the digital scene.

In one embodiment, the first perceptibility level can include a visibility parameter and/or an audibility parameter. The second perceptibility level can also include a visibility parameter and/or an audibility parameter. The visibility parameter can for example, be determined by one or more of: opacity, translucency, brightness, sharpness, contrast. The audibility parameter can, for example, be determined by one or more of: volume, bass, treble, bitrate, encoding, bandwidth, frequency range, power level.

In one embodiment, the virtual reality layer includes multiple virtual reality sublayers and different sublayers of the multiple virtual reality sublayers can be associated with individual perceptibility controls. The virtual reality layer can include multiple virtual reality objects. The different virtual reality objects of the multiple virtual reality sublayers can be associated with individual perceptibility controls.

In process 806, the first perceptibility level is determined using the individual perceptibility controls of the different sublayers of the multiple virtual reality sublayers or using the individual perceptibility controls of the different virtual reality objects of the multiple virtual reality objects. In one embodiment, the basic reality layer includes multiple basic reality sublayers and different sublayers of the multiple basic reality sublayers can be associated with individual perceptibility controls. The basic reality layer can include multiple reality objects and the different reality objects of the multiple reality objects can also be associated with individual perceptibility controls. In process 808, the second perceptibility level is determined using the individual perceptibility controls of the different sublayers of the multiple basic reality sublayers or using the individual perceptibility controls of the different reality objects of the multiple reality objects.

The digital scene is generated using the virtual reality layer at a first perceptibility level and the basic reality layer at a second perceptibility level, in process 810. In one embodiment, the first perceptibility level can be increased or the second perceptibility level can be decreased to increase the virtualness level of the digital scene 812. The first perceptibility level can be decreased or the second perceptibility level can be increased to decrease the virtualness level of the digital scene 814.

Figure 9:
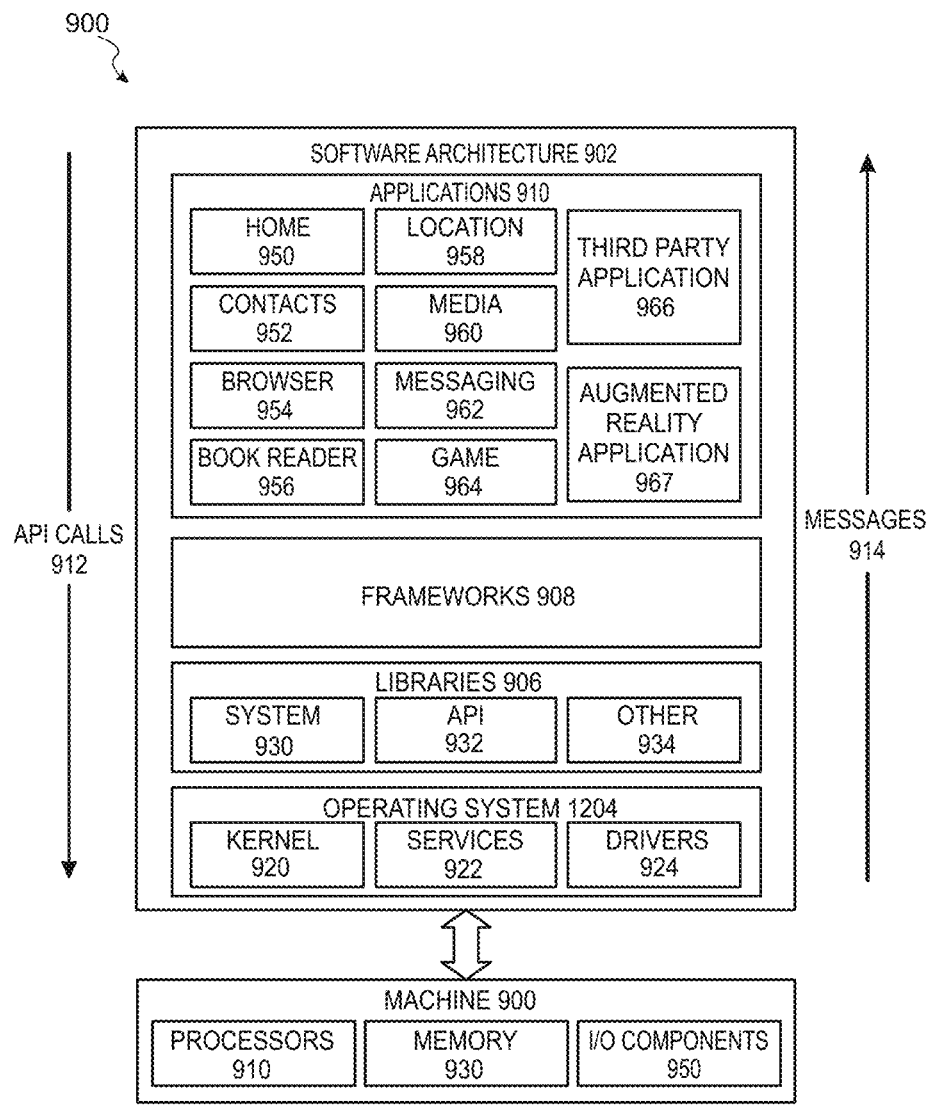
FIG. 9 is a block diagram illustrating an example of a software architecture that may be installed on a machine, in accordance with embodiments of the present disclosure.

FIG. 9 is a block diagram illustrating an example of a software architecture 900 that may be installed on a machine, in accordance with embodiments of the present disclosure.

FIG. 9 is a block diagram 900 illustrating an architecture of software 902, which can be installed on any one or more of the devices described above. FIG. 9 is a non-limiting example of a software architecture, and it will be appreciated that many other architectures can be implemented to facilitate the functionality described herein. In various embodiments, the software 902 is implemented by hardware such as machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 1106, frameworks 908, and applications 910. Operationally, the applications 910 invoke API calls 912 through the software stack and receive messages 914 in response to the API calls 912, in accordance with some embodiments.

In some embodiments, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH drivers, flash memory drivers, serial communication drivers (e.g., Universal Serial Bus (USB) drivers), WI-FI drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematics functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a search/discovery application 956, a location application 958, a media application 960, a messaging application 962, a game application 964, and other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the Android, Windows or iOS. software development kit (SDK) by an entity other than the vendor of the particular platform) may be mobile software running on a mobile operating system such as Android, Windows or iOS, or another mobile operating systems. In this example, the third party application 966 can invoke the API calls 912 provided by the operating system 904 to facilitate functionality described herein.

An augmented reality application 967 may implement any system or method described herein, including integration of augmented, alternate, virtual and/or mixed realities for digital experience enhancement, or any other operation described herein.

Figure 10:
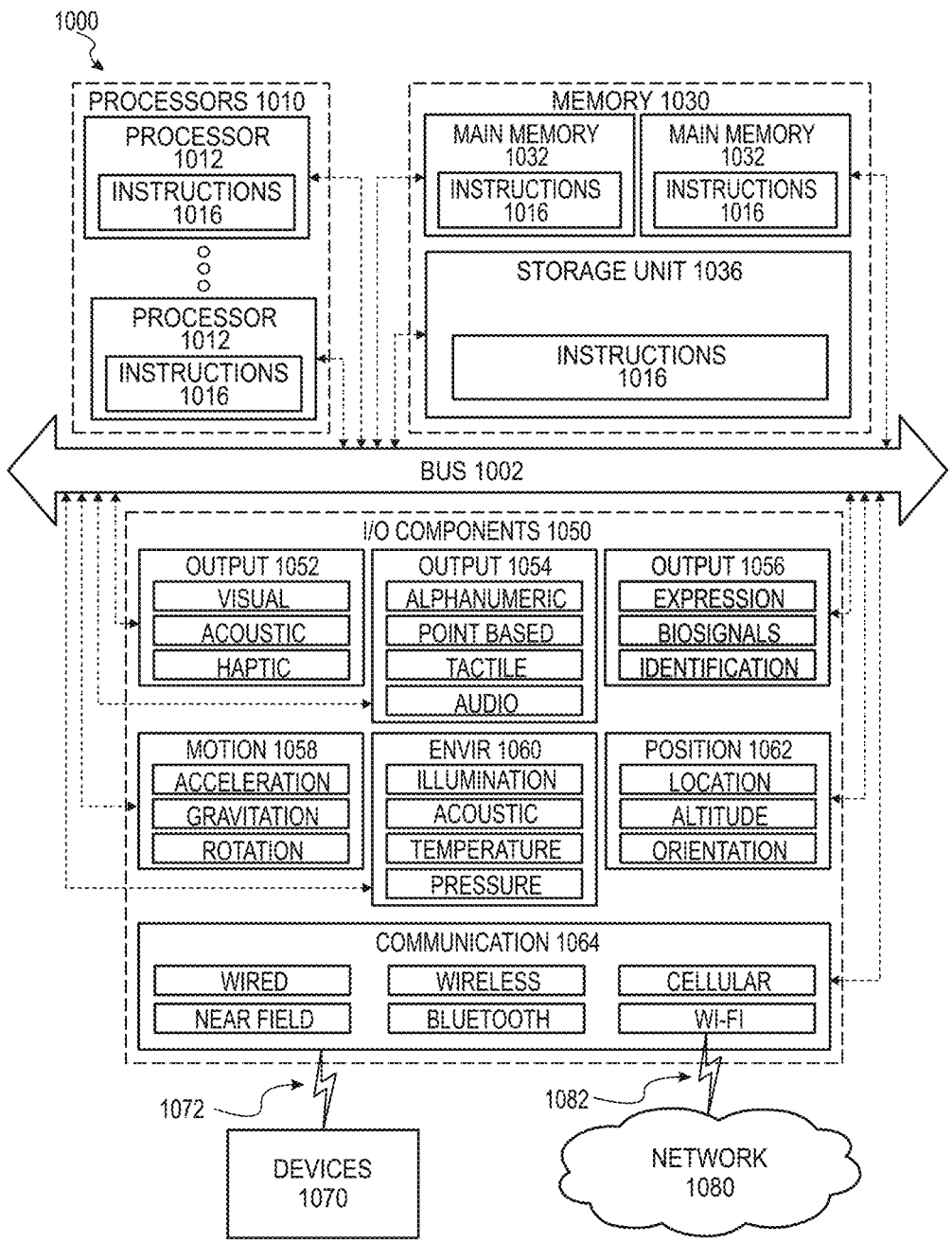
FIG. 10 is a block diagram illustrating components of a machine, according to some example embodiments, able to read a set of instructions from a machine-readable medium (e.g., a machine-readable storage medium) and perform any one or more of the methodologies discussed herein.

FIG. 10 is a block diagram illustrating components of a machine 1000, according to some example embodiments, able to read a set of instructions from a machine-readable medium (e.g., a machine-readable storage medium) and perform any one or more of the methodologies discussed herein.

Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. Additionally, or alternatively, the instruction can implement any module of FIG. 3A and any module of FIG. 4A, and so forth. The instructions transform the general, non-programmed machine into a particular machine programmed to carry out the described and illustrated functions in the manner described.

In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1012 and processor 1014 that may execute instructions 1016. The term "processor" is intended to include multi-core processor that may comprise two or more independent processors (sometimes referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof The memory/storage 1030 can include a main memory 1032, a static memory 1034, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" or "machine-readable storage medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof The term "machine-readable medium" or "machine-readable storage medium" should be taken to include a single medium or multiple media (e.g., a centralized or distributed database, or associated caches and servers) able to store instructions 1016. The term "machine-readable medium" or "machine-readable storage medium" shall also be taken to include any medium, or combination of multiple media, that is capable of storing, encoding or carrying a set of instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion and the grouping is in no way limiting. In example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 1052 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, communication components 1064 include wired communication components, wireless communication components, cellular communication components, Near Field Communication (NFC) components, Bluetooth. components (e.g., Bluetooth. Low Energy), WI-FI components, and other communication components to provide communication via other modalities. The devices 1070 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 1064 can detect identifiers or include components operable to detect identifiers. For example, the communication components 1064 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI.®. network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of transfer protocols (e.g., HTTP). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure. Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method to generate a user interface of a scene to depict a virtual object and a reality object, the method, comprising:
rendering the virtual object in the user interface as having a first perceptibility level;
rendering the reality object in the user interface as having a second perceptibility level;
wherein, the reality object includes a photorealistic depiction of a physical object in a real environment associated with the scene.

2. The method of claim 1, wherein:
one or more of the first perceptibility level and the second perceptibility is adjustable through opacity or translucency.

3. The method of claim 1, wherein, one or more of:
(i) the first perceptibility level includes levels of human perceptibility; and
(ii) the second perceptibility level includes levels of human perceptibility.

4. The method of claim 1, wherein:
the scene includes an augmented reality environment associated with real environment.

5. The method of claim 1, wherein:
the virtual object is irrelevant and uncorrelated to the real environment;
wherein the first perceptibility level of the virtual object is of a finite level;
wherein the second perceptibility level of the reality object is unobservable or negligible;
wherein, the scene includes a virtual reality environment.

6. The method of claim 1, wherein:
the second perceptibility level of the reality object is of a finite level;
wherein the first perceptibility level of the virtual object is unobservable or negligible;
wherein, the scene includes a basic reality environment.

7. The method of claim 1, wherein:
one or more of the first perceptibility level and the second perceptibility level is adjustable by a user accessing the scene via the user interface, using control features in the user interface.

8. The method of claim 7, wherein:
the control features include one or more of a touchable slider, dial or button, voice control features, gesture control features, body movement control features, gaze detection and eye movement detection features.

9. The method of claim 1, wherein:
one or more of the first perceptibility level and the second perceptibility level is adjustable by one or more of: a system platform, operating system or application, or device settings on a device on which the user interface is rendered.

10. The method of claim 1,
wherein, one or more of the first perceptibility level and the second perceptibility level is adjustable by a user.

11. The method of claim 10, wherein, the user is physically located in the real world environment.

12. The method of claim 1, wherein, one or more of:
(i) the first perceptibility level is independently adjustable in relation to the second perceptibility; and
(ii) the second perceptibility level is independently adjustable in relation to the first perceptibility.

13. The method of claim 1, wherein:
the virtual object is one or more of, contextually relevant, temporally relevant and spatially relevant to real phenomenon in the real environment.

14. A method to adjust a virtualness level of a digital scene, the method, comprising:
rendering a virtual reality layer in the digital scene;
wherein, the virtual reality layer comprises one or more virtual objects;
further rendering a basic reality layer in the digital scene;
wherein, the basic reality layer comprises one or more reality objects;
wherein, the reality objects include photorealistic depictions of real world phenomenon in a real environment associated with the digital scene;
generating the digital scene using the virtual reality layer at a first perceptibility level and the basic reality layer at a second perceptibility level.

15. The method of claim 14, further comprising, one or more of:
(i) switching the second perceptibility level of the basic reality layer to off or of negligible perceptibility to generate a virtual reality environment in the digital scene; and
(ii) switching the first perceptibility level of the virtual reality layer to off or of negligible perceptibility to generate a basic reality environment in the digital scene.

16. The method of claim 14, further comprising, one or more of:
(i) decreasing the first perceptibility level or increasing the second perceptibility level to decrease the virtualness level of the digital scene; and
(ii) increasing the first perceptibility level or decreasing the second perceptibility level to increase the virtualness level of the digital scene;
wherein: the digital scene includes an augmented reality environment where the first perceptibility level is of an observable level and the second perceptibility level is of an observable level.

17. The method of claim 14, wherein, one or more of:
(i) the first perceptibility level includes one or more of, a visibility parameter and an audibility parameter; and
(ii) the second perceptibility level includes one or more of, a visibility parameter and an audibility parameter.

18. The method of claim 17, wherein:
the visibility parameter is determined by one or more of: opacity, translucency, brightness, sharpness, or contrast.

19. The method of claim 17, wherein:
the audibility parameter is determined by one or more of: volume, bass, treble, bitrate, encoding, bandwidth, frequency range, or power level.

20. The method of claim 14, wherein, one or more of
(i) the virtual reality layer includes multiple virtual reality sublayers; and
(ii) the basic reality layer includes multiple basic reality sublayers.

21. The method of claim 14,
wherein, the virtual reality layer includes multiple virtual reality sublayers;
wherein, different sublayers of the multiple virtual reality sublayers are associated with individual perceptibility controls;
wherein, the first perceptibility level is determined using one or more of the individual perceptibility controls of the different sublayers of the multiple virtual reality sublayers.

22. The method of claim 14,
wherein, the basic reality layer includes multiple basic reality sublayers;
wherein, different sublayers of the multiple basic reality sublayers are associated with individual perceptibility controls;
wherein, the second perceptibility level is determined using one or more of the individual perceptibility controls of the different sublayers of the multiple basic reality sublayers.

23. The method of claim 14,
wherein, the virtual reality layer includes multiple virtual reality objects;
wherein, different virtual reality objects of the multiple virtual reality sublayers are associated with individual perceptibility controls;
wherein, the first perceptibility level is determined using one or more of the individual perceptibility controls of the different virtual reality objects of the multiple virtual reality objects.

24. The method of claim 14,
wherein, the basic reality layer includes multiple reality objects;
wherein, different reality objects of the multiple reality objects are associated with individual perceptibility controls;
wherein, the second perceptibility level is determined using one or more of the individual perceptibility controls of the different reality objects of the multiple reality objects.

25. The method of claim 14, wherein, the virtual reality layer includes multiple virtual reality objects.

26. The method of claim 25, wherein, different virtual reality objects of the multiple virtual reality sublayers are associated with individual perceptibility controls.

27. The method of claim 14, wherein, the basic reality layer includes multiple reality objects.

28. The method of claim 27, wherein, different reality objects of the multiple reality objects are associated with individual perceptibility controls.

29. An apparatus to generate a user interface of a scene to depict a virtual object and a reality object, the apparatus, comprising:
a processor;
memory having stored thereon instructions, which when executed by a processor, cause the processor to:
render the virtual object in the user interface as having a first perceptibility level;

render the reality object in the user interface as having a second perceptibility level;

wherein, the reality object includes a photorealistic depiction of a physical object in a real environment associated with the scene.

30. The apparatus of claim 29, wherein, one or more of the first perceptibility level and the second perceptibility is adjustable through opacity or translucency.

31. The apparatus of claim 29, wherein, the memory having stored thereon further instructions, which when executed by the processor, cause the processor to:

decrease a virtualness level of the scene by one or more of:

(i) decreasing the first perceptibility level; and
(ii) increasing the second perceptibility level.

32. The apparatus of claim 29, wherein, the memory having stored thereon further instructions, which when executed by the processor, cause the processor to:

increase a virtualness level of the scene by one or more of:
(i) increasing the first perceptibility level; and
(ii) decreasing the second perceptibility level.

\* \* \* \* \*